(12) United States Patent
Reilly et al.

(10) Patent No.: US 10,523,983 B2
(45) Date of Patent: Dec. 31, 2019

(54) PLAYBACK DEVICE DEMONSTRATION

(71) Applicant: Sonos, Inc., Santa Barbara, CA (US)

(72) Inventors: Jonathon Reilly, Cambridge, MA (US); Jason Heffernan, Hyde Park, MA (US); Andrej Sarkic, Cambridge, MA (US); Zivthan Dubrovsky, Lexington, MA (US); Luis Vega-Zayas, Arlington, MA (US); Nicholas Salzman, Brookline, MA (US); Adrian Eiben, Hudson, MA (US)

(73) Assignee: Sonos, Inc., Santa Barbara, CA (US)

( * ) Notice: Subject to any disclaimer, the term of this patent is extended or adjusted under 35 U.S.C. 154(b) by 28 days.

(21) Appl. No.: 15/240,892

(22) Filed: Aug. 18, 2016

(65) Prior Publication Data
US 2016/0360242 A1 Dec. 8, 2016

Related U.S. Application Data

(63) Continuation of application No. 13/287,806, filed on Nov. 2, 2011, now Pat. No. 9,460,631.

(51) Int. Cl.
*G06F 17/00* (2019.01)
*H04N 21/2387* (2011.01)
(Continued)

(52) U.S. Cl.
CPC ..... *H04N 21/2387* (2013.01); *G06Q 30/0623* (2013.01); *G09B 5/06* (2013.01); *G09B 5/065* (2013.01); *G09B 25/04* (2013.01); *H04N 21/436* (2013.01); *H04R 27/00* (2013.01); *H04W 4/80* (2018.02)

(58) Field of Classification Search
CPC ....................................... G06Q 30/0623–0629
See application file for complete search history.

(56) References Cited

U.S. PATENT DOCUMENTS

| 5,440,644 A | 8/1995 | Farinelli et al. |
| 5,606,624 A * | 2/1997 | Damato ................ H04R 27/00 340/4.42 |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

"Denon 2003-2004 Product Catalog," Denon, 2003-2004, 44 pages.
(Continued)

*Primary Examiner* — Keith D Bloomquist

(57) ABSTRACT

A playback device may be communicatively connected to a network device at a demonstration location. After connecting to the network device, the playback device may receive from the network device, a message indicating media content for playback by the playback device. In response to receiving the message, the playback device may play the media content, where playing the media content comprises modifying a default configuration of a demonstration mode. After receiving the message, the playback device may be disconnected from the network device. After disconnecting from the network device, the playback device may return to the default configuration of the demonstration mode.

21 Claims, 15 Drawing Sheets

(51) Int. Cl.
*G06Q 30/06* (2012.01)
*H04R 27/00* (2006.01)
*G09B 5/06* (2006.01)
*G09B 25/04* (2006.01)
*H04N 21/436* (2011.01)
*H04W 4/80* (2018.01)

(56) References Cited

U.S. PATENT DOCUMENTS

| | | |
|---|---|---|
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington et al. |
| 8,243,141 B2 | 8/2012 | Greenberger et al. |
| 8,483,853 B1 | 7/2013 | Lambourne |
| 8,886,933 B1 | 11/2014 | Poiesz et al. |
| 8,905,763 B1* | 12/2014 | Hu .................... G09B 19/00 434/365 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2003/0215097 A1* | 11/2003 | Crutchfield, Jr. .... H04R 29/001 381/61 |
| 2004/0024478 A1 | 2/2004 | Hans et al. |
| 2007/0097255 A1 | 5/2007 | Dalton et al. |
| 2007/0142944 A1 | 6/2007 | Goldberg et al. |
| 2007/0264984 A1 | 11/2007 | Stavenow et al. |
| 2008/0225124 A1 | 9/2008 | Schinner et al. |
| 2009/0006970 A1* | 1/2009 | Jeffery .................... D06F 33/02 715/733 |
| 2011/0149159 A1 | 6/2011 | Candelore et al. |
| 2011/0225330 A1 | 9/2011 | Lavian et al. |
| 2012/0324514 A1 | 12/2012 | Dashevskiy et al. |
| 2013/0073431 A1* | 3/2013 | Suro .................. G06Q 30/0623 705/26.61 |

OTHER PUBLICATIONS

U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.

* cited by examiner

PLAYBACK DEVICE DEMONSTRATION

CROSS REFERENCE TO RELATED APPLICATIONS

This disclosure claims the benefit of priority as a continuation under 35 U.S.C. § 120 to U.S. application Ser. No. 13/287,806 filed Nov. 2, 2011 entitled "Systems, Methods, Apparatus, and Articles of Manufacture for Playback Demonstration at a Point of Sale Display", the contents of which is hereby incorporated by reference in its entirety for all purposes.

FIELD OF THE DISCLOSURE

The disclosure is related to consumer electronics and, more particularly, to managing a digital playback device demonstration at a point of sale display.

BACKGROUND

Technological advancements have increased the accessibility of music content, as well as other types of media, such as television content, movies, and interactive content. For example, a user can access audio, video, or both audio and video content over the Internet through an online store, an Internet radio station, an online music service, an online movie service, and the like, in addition to the more traditional avenues of accessing audio and video content. Demand for such audio and video content continues to surge. Given the high demand, technology used to access and play such content has likewise improved.

Retail environments offer various electronic products to customers. For example, digital devices, such as receivers, players, speakers, and so on, can often be purchased in retail environments, such as electronic equipment stores. Because customers often want to view demonstrations of the products before purchase, retail environments may display products to demonstrate music, movies, and so forth.

Product demonstrations using applications are frequently outdated or otherwise not in keeping with media trends. For example, customers sometimes view demonstrations of songs or videos that are months old. Further, Internet-enabled products sometimes require the entry of account information to access services provided via the Internet.

BRIEF DESCRIPTION OF THE DRAWINGS

Features, aspects, and advantages of the presently disclosed technology are better understood with regard to the following description, appended claims, and accompanying drawings where:

Figure 1:
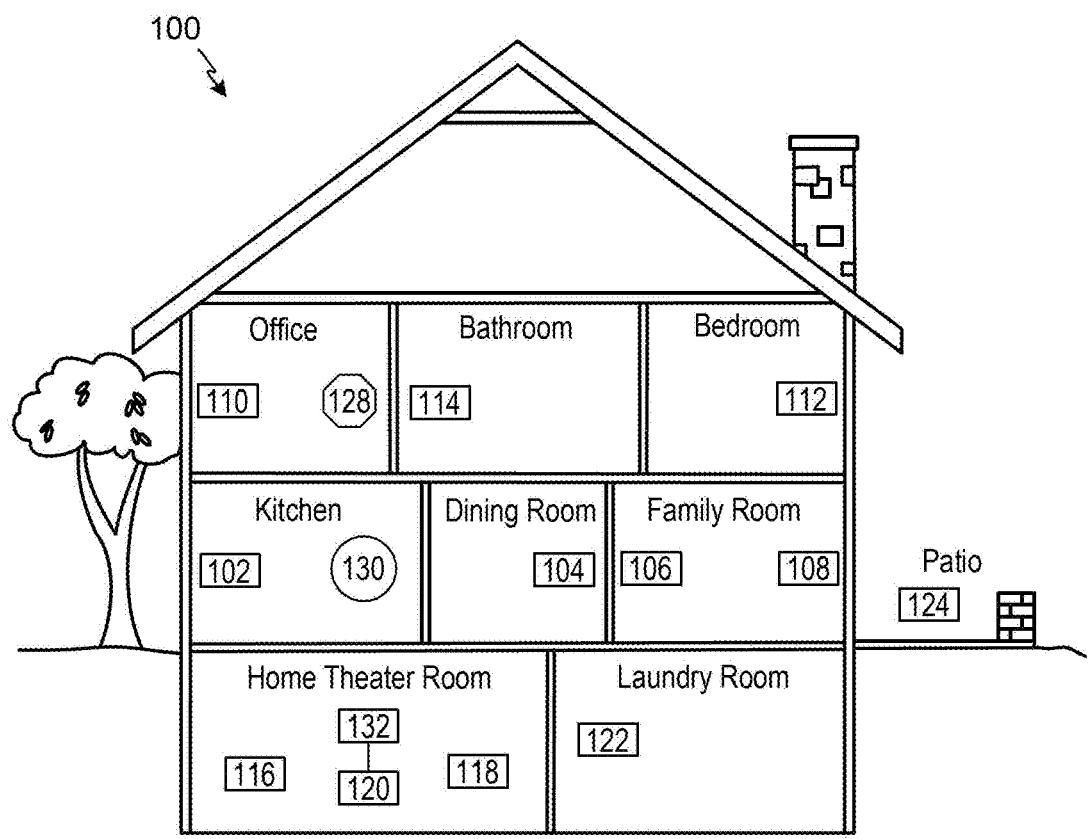
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

A commercial product launch and sale through a retail establishment involves a brand strategy including a retail point of sale (POS) display that may function in both a network connected and non-connected environment where consumers can experience a product, such as a multimedia playback device (e.g., a zone player) through the POS display. As used herein, a retail environment may include any area with foot traffic (e.g., an electronics store, a department store, an airport, coffee shop, and the like). As such, a retail environment may not necessarily be known for retail.

Certain examples provide one or more playback devices (e.g., zone players, speakers, and so on) that may be arranged in a configuration including a display at a point of sale location, such as a retail establishment, kiosk, cart, and so on. A display (e.g., a video display at a point of sale location) and/or speakers may receive content and generate one or more outputs using the received content.

Certain examples provide a controller, such as an Android™-based controller (e.g., accessible via a smartphone), to facilitate interaction with a user interface to control and explore the advertised product at the point of sale display.

Certain examples provide a user experience to potential customers whether the products on display in the retail environment are connected or non-connected with an external network, such as the Internet. Certain examples enable potential customers to view information and interact with demo products regardless of whether the products are connected to an external network. Certain examples can also limit what a customer can access or change (e.g., can lock a device) so as to not allow a customer to disrupt or render inoperable a demonstration device.

Example systems, methods, apparatus, and articles of manufacture disclosed herein provide for configuration and management of one or more playback devices in demonstration configuration of equipment at a point of sale location.

Certain embodiments provide a system for demonstration of a playback device at a point of sale. The example system includes a playback device configured for demonstration playback by one or more users at the point of sale. The example playback device is to respond to an allowed set of user commands to provide content playback. The example system includes a user control to facilitate user interaction with the playback device and to provide information for user review regarding the playback device. The example user control includes an option for user selection to provide additional information regarding playback device functionality. The example user control is restricted to provide repeatable playability of the playback device for demonstration at the point of sale. The example system is to monitor the playback device for repeatable playability by users in the system.

Certain embodiments provide a method for demonstration of device playback at a point of sale. The example method includes providing, using a playback device, information to a user at a point of sale regarding playback device functionality. The example method includes facilitating user interaction with the playback device to play back content via the playback device by one or more users at the point of sale. The example method includes limiting user access to control the playback device to provide repeatable playability of the playback device for demonstration at the point of sale. The example method includes monitoring the playback device for repeatable playability by users at the point of sale.

Certain embodiments provide a tangible computer readable storage medium including a set of instructions for execution using a processor, the set of instructions, when executed by the processor, implementing a demonstration controller for one or more playback devices by one or more users at a point of sale. The example implemented controller includes a display to provide information to a user at a point of sale regarding playback device functionality. The example implemented controller includes a user control to facilitate user interaction with the playback device to play back content via the playback device by one or more users at the point of sale. The example controller limits user access to control the playback device to provide repeatable playability of the playback device for demonstration at the point of sale and monitors the playback device for repeatable playability by users at the point of sale.

Certain embodiments facilitate interaction between users and multimedia equipment manufacturers at a point of sale location. For example, a user can view a presentation and/or interact with a representative of a multimedia equipment manufacturer (e.g., SONOS®) rather than a representative of the retail point of sale location while viewing and interacting with the equipment at the point of sale location.

Certain embodiments enable a user to playback multimedia content at a demonstration configuration of playback device(s) at a point of sale location. For example, a user can play a song from his/her IPHONE™ or IPOD™ by docked (e.g., wired or wirelessly docking) the device to a point of sale display.

Although the following discloses example systems, methods, apparatus, and articles of manufacture including, among other components, firmware and/or software executed on hardware, it should be noted that such systems, methods, apparatus, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

II. Example Environment

Referring now to the drawings, in which like numerals can refer to like parts throughout the figures, FIG. 1 shows an example system configuration 100 in which one or more of the method and/or apparatus disclosed herein can be practiced or implemented. By way of illustration, the system configuration 100 represents a home with multiple zones. Each zone, for example, represents a different room or space, such as an office, bathroom, bedroom, kitchen, dining room, family room, home theater room, utility or laundry room, and patio. While not shown here, a single zone can cover more than one room or space. One or more of zone players 102-124 are shown in each respective zone. A zone player 102-124, also referred to as a playback device, multimedia unit, speaker, and so on, provides audio, video, and/or audiovisual output. A controller 130 (e.g., shown in the kitchen for purposes of illustration) provides control to the system configuration 100. The system configuration 100 illustrates an example whole house audio system, though it is understood that the technology described herein is not limited to its particular place of application or to an expansive system like a whole house audio system 100 of FIG. 1.

Figure 2A:
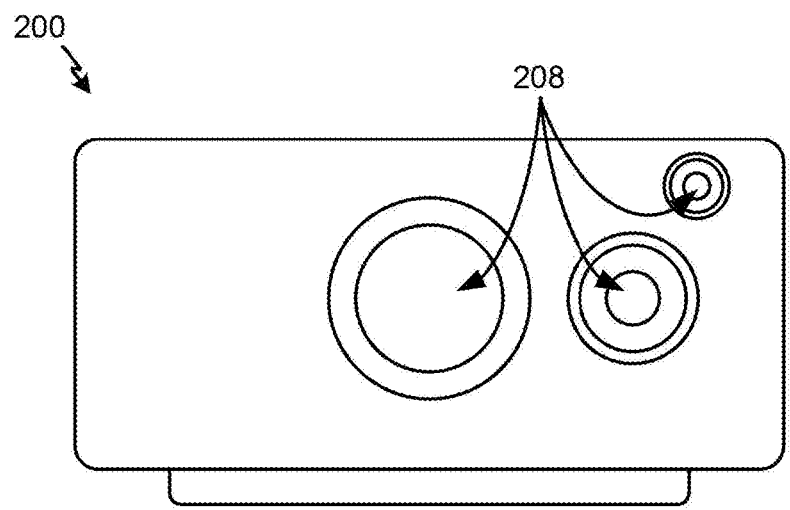
FIG. 2A shows an illustration of an example playback device (e.g., a zone player) having a built-in amplifier and speakers.
Figure 2B:
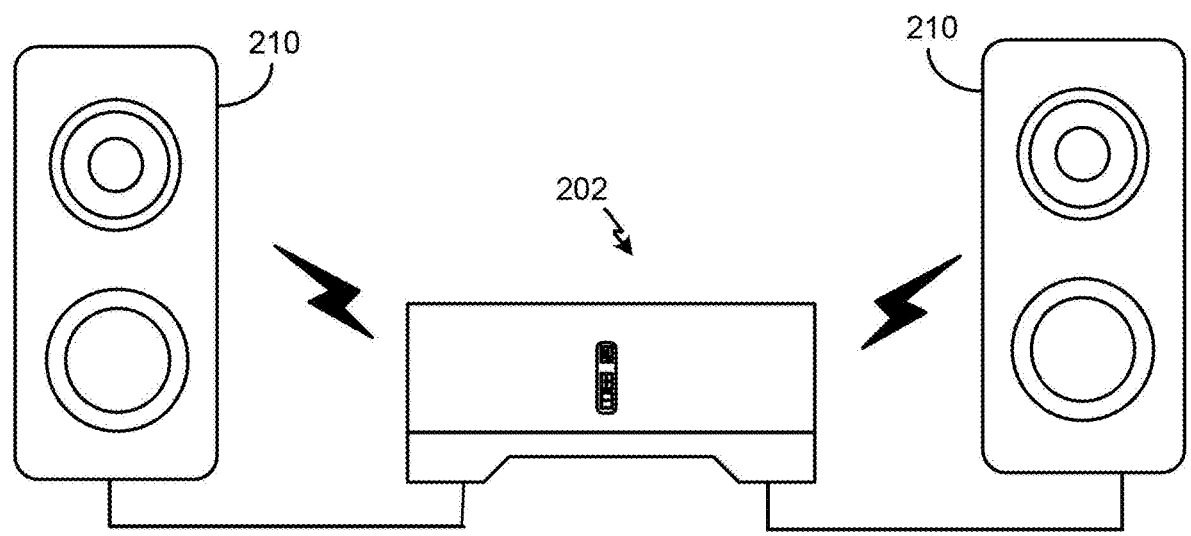
FIG. 2B shows an illustration of an example playback device (e.g., a zone player) having a built-in amplifier and connected to external speakers.
Figure 2C:
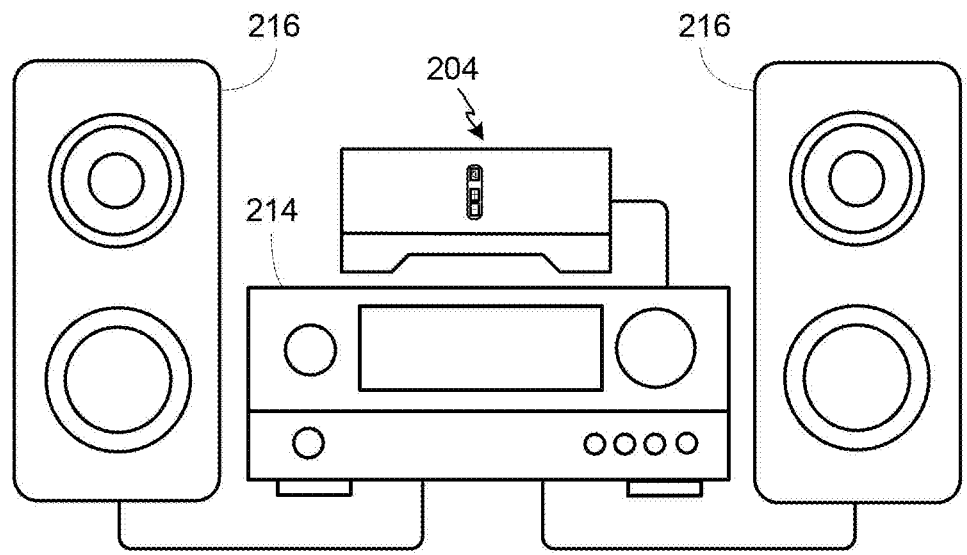
FIG. 2C shows an illustration of an example playback device (e.g., a zone player) connected to an A/V receiver and speakers.

FIGS. 2A, 2B, and 2C show example illustrations of zone players 200-204. The zone players 200-204 of FIGS. 2A, 2B, and 2C, respectively, can correspond to any of the zone players 102-124 of FIG. 1. While certain embodiments provide multiple zone players, an audio output can be generated using only a single zone player. FIG. 2A illustrates a zone player 200 including sound producing equipment 208 capable of generating sound or an audio output corresponding to a signal received (e.g., wirelessly and/or via a wired interface). The sound producing equipment 208 of the zone player 200 of FIG. 2A includes a built-in amplifier (not shown in this illustration) and speakers (e.g., a tweeter, a mid-range driver, and/or a subwoofer. In certain embodiments, the zone player 200 of FIG. 2A can be configured to play stereophonic audio or monaural audio. In some embodiments, the zone player 200 of FIG. 2A can be configured as a component in a combination of zone players to play stereophonic audio, monaural audio, and/or surround audio. As described in greater detail below, in some embodiments, the example zone player 200 of FIG. 2A can also transmit a second signal to, for example, other zone player(s) in the same or different zone(s), speaker(s), receiver(s), and so on. Transmission of the second signal can be part of, for example, a system in which multiple zone players, speakers, receivers, and so on, form a network to, for example, present media content in a synchronization or distributed manner.

The example zone player 202 of FIG. 2B includes a built-in amplifier (not shown in this illustration) to power a set of detached speakers 210. The speakers 210 of FIG. 2B can include, for example, any type of loudspeaker. The zone player 202 of FIG. 2B can communicate a signal corresponding to audio content to the detached speakers 210 via wired and/or wireless channels. Instead of receiving and generating audio content as in FIG. 2A, the zone player 202 of FIG. 2B receives the audio content and transmits the same (e.g., after processing the received signal) to the detached speakers 210. Similar to the example zone player 200 of FIG. 2A, in some embodiments the zone player 202 can transmit a second signal to, for example, other zone player(s) in the same or different zone(s), speaker(s), receiver(s), and so on.

The example zone player 204 of FIG. 2C does not include an amplifier, but allows a receiver 214, or another audio and/or video type device with built-in amplification, to connect to a data network 128 of FIG. 1 and to play audio received over the data network 128 via the receiver 214 and a set of detached speakers 216. In addition to the wired couplings shown in FIG. 2C, the detached speakers 216 can receive audio content via a wireless communication channel between the detached speakers 216 and, for example, the zone player 204 and/or the receiver 214. In some embodiments the zone player 202 can transmit a second signal to, for example, other zone player(s) in the same or different zone(s), speaker(s), receiver(s), and so on.

Example zone players include a "SONOS® S5," "SONOS® PLAY:5," "SONOS® PLAY:3," "ZONE-PLAYER® 120," and "ZONEPLAYER® 90," which are offered by Sonos, Inc. of Santa Barbara, Calif. Any other past, present, and/or future zone players can additionally or alternatively be used to implement the zone players of example embodiments disclosed herein. A zone player can also be referred to herein as a playback device, and a zone player is not limited to the particular examples illustrated in FIGS. 2A, 2B, and 2C. For example, a zone player can include a wired or wireless headphone. In other examples, a zone player might include a subwoofer. In yet other examples, a zone player can include a sound bar. In an example, a zone player can include or interact with a docking station for an Apple IPOD' or similar device. In some embodiments, a zone player can relay one or more signals received from, for example, a first zone player to another playback device. In some embodiments, a zone player can receive a first signal and generate an output corresponding to the first signal and, simultaneously or separately, can receive a second signal and transmit or relay the second signal to another zone player(s), speaker(s), receiver(s), and so on. Thus, an example zone player described herein can act as a playback device and, at the same time, operate as a hub in a network of zone players. In such instances, media content corresponding to the first signal can be different from the media content corresponding to the second signal.

Figure 3:
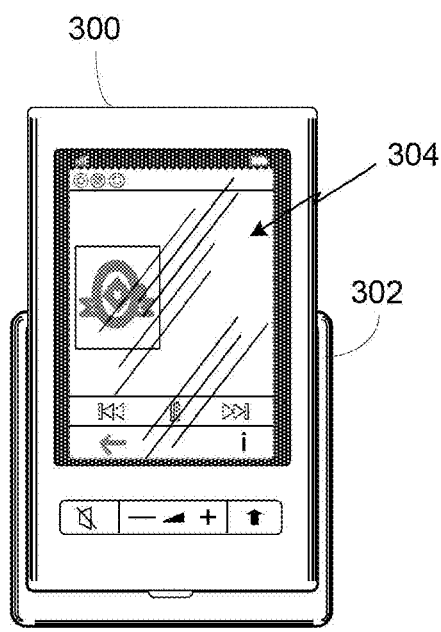
FIG. 3 shows an illustration of an example controller.

FIG. 3 shows an example illustration of a wireless controller 300 in a docking station 302. The controller 300 can correspond to the controlling device 130 of FIG. 1. The controller 300 is provided with a touch screen 304 that allows a user to interact with the controller 300, for example, to retrieve and navigate a playlist of audio items, control operations of one or more zone players, and provide overall control of the system configuration 100. In certain embodiments, any number of controllers can be used to control the system configuration 100. In certain embodiments, there can be a limit on the number of controllers that can control the system configuration 100. The controllers might be wireless like wireless controller 300 or wired to the data network 128. Furthermore, an application running on any network-enabled portable devices, such as an iPhone™, iPad™, Android™ powered phone, or any other smart phone or network-enabled device can be used as a controller by connecting to the data network 128. An application running on a laptop or desktop PC or Mac can also be used as a controller. Example controllers include a "SONOS® CONTROLLER 200," "SONOS® CONTROLLER FOR IPHONE," "SONOS® CONTROLLER FOR IPAD," "SONOS® CONTROLLER FOR ANDROID," and "SONOS® CONTROLLER FOR MAC OR PC," which are offered by Sonos, Inc. of Santa Barbara, Calif. The flexibility of such an application and its ability to be ported to a new type of portable device is advantageous.

Referring back to the system configuration 100 of FIG. 1, a particular zone can contain one or more zone players. For example, the family room of FIG. 1 contains two zone players 106 and 108, while the kitchen is shown with one zone player 102. Zones can be dynamically configured by positioning a zone player in a room or space and assigning via the controller 130 the zone player to a new or existing zone. As such, zones can be created, combined with another zone, removed, and given a specific name (e.g., "Kitchen"), if so programmed. The zone players 102 to 124 are coupled directly or indirectly to a data network, such as the data network 128 shown in FIG. 1. The data network 128 is represented by an octagon in the figure to stand out from other components shown in the figure. While the data network 128 is shown in a single location, it is understood that such a network can be distributed in and around the system configuration 100.

Particularly, the data network 128 can be a wired network, a wireless network, or a combination of both. In some embodiments, one or more of the zone players 102-124 are wirelessly coupled to the data network 128 based on a proprietary mesh network. In some embodiments, one or more of the zone players 102-124 are wirelessly coupled to the data network 128 using a non-mesh topology. In some embodiments, one or more of the zone players 102-124 are coupled via a wire to the data network 128 using Ethernet or similar technology. In addition to the one or more zone players 102-124 connecting to the data network 128, the data network 128 can further allow access to a wide area network, such as the Internet.

In certain embodiments, the data network 128 can be created by connecting any of the zone players 102-124, or some other connecting device, to a broadband router. Other zone players 102-124 can then be added wired or wirelessly to the data network 128. For example, a zone player (e.g., any of zone players 102-124) can be added to the system configuration 100 by simply pressing a button on the zone player itself, which enables a connection to be made to the data network 128. The broadband router can be connected to an Internet Service Provider (ISP), for example. The broadband router can be used to form another data network within the system configuration 100, which can be used in other applications (e.g., web surfing). The data network 128 can also be used in other applications, if so programmed. Further, in certain embodiments, the data network 128 is the same network used for other applications in the household.

In certain embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly listening to the audio. Further, zones can be put into a "party mode" such that all associated zones will play audio in synchrony.

In certain embodiments, a zone contains two or more zone players. For example, the family room contains two zone players 106 and 108, and the home theater room contains at least zone players 116, 118, and 120. A zone can be configured to contain as many zone players as desired, and for example, the home theater room might contain additional zone players to play audio from a 5.1 channel or greater audio source (e.g., a movie encoded with 5.1 or greater audio channels). If a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players can play audio in synchrony with other zone players.

In certain embodiments, three or more zone players can be configured to play various channels of audio that is encoded with three channels or more sound. For example, the home theater room shows zone players 116, 118, and 120. If the sound is encoded as 2.1 channel audio, then the zone player 116 can be configured to play left channel audio, the zone player 118 can be configured to play right channel audio, and the zone player 120 can be configured to play bass frequencies. Other configurations are possible and depend on the number of zone players and the type of audio. Further, a particular zone can be configured to play a 5.1 channel audio in one instance, such as when playing audio from a movie, and then dynamically switch to play stereo, such as when playing audio from a two channel source.

In certain embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

Sources of audio content to be played by zone players 102-124 are numerous. Music from a personal library stored on a computer or networked-attached storage (NAS) can be accessed via the data network 128 and played. Internet radio stations, shows, and podcasts can be accessed via the data network 128. Music services that let a user stream and download music and audio content can be accessed via the data network 128. Further, music can be obtained from traditional sources, such as a turntable or CD player, via a line-in connection to a zone player, for example. Audio content can also be accessed through AirPlay™ wireless technology by Apple, Inc., for example. Audio content received from one or more sources can be shared amongst the zone players 102 to 124 via the data network 128 and/or the controller 130. The above-disclosed sources of audio content are referred to herein as network-based audio information sources. However, network-based audio information sources are not limited thereto.

The example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Playback Device

Figure 4:
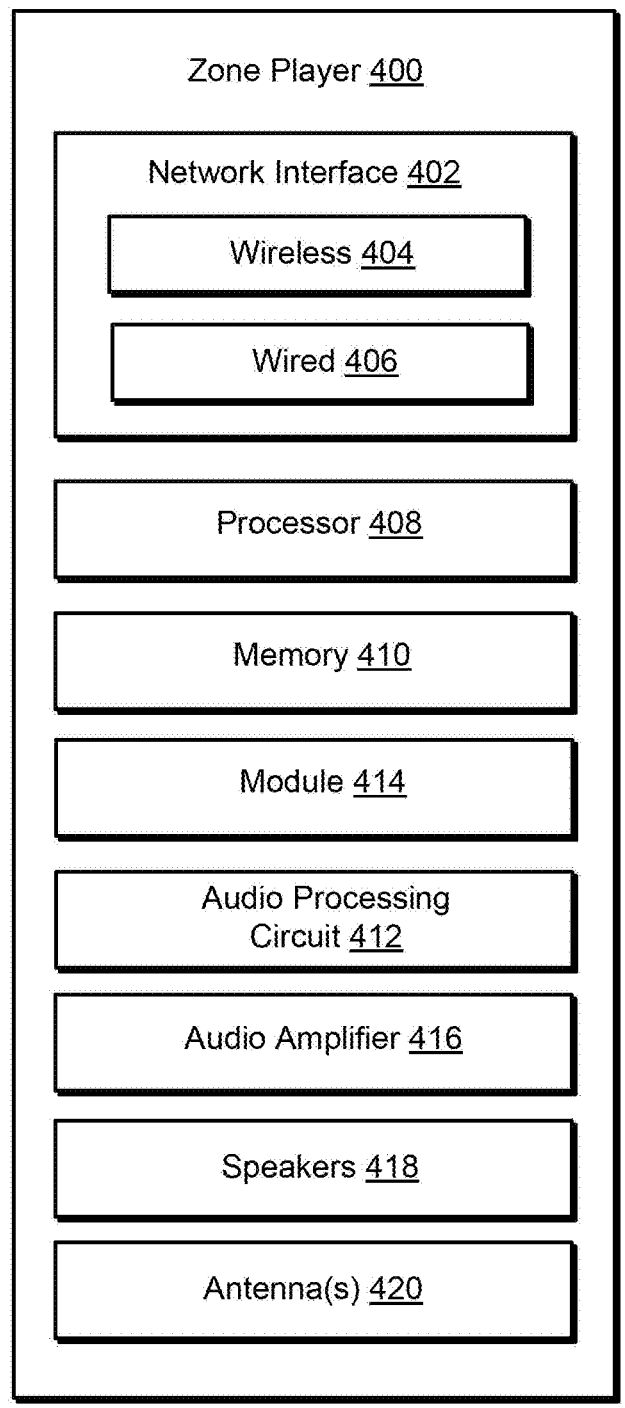
FIG. 4 shows an internal functional block diagram of an example playback device (e.g., a zone player)

Referring now to FIG. 4, there is shown an example functional block diagram of a zone player 400 in accordance with an embodiment. The zone player 400 of FIG. 4 includes a network interface 402, a processor 408, a memory 410, an audio processing component 412, a module 414, an audio amplifier 416, and a speaker unit 418 coupled to the audio amplifier 416. FIG. 2A shows an example illustration of such a zone player. Other types of zone players can not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a lamp for indoor or outdoor use.

Referring back to FIG. 4, the network interface 402 facilitates a data flow between zone players and other devices on a data network (e.g., the data network 128 of FIG. 1) and the zone player 400. In some embodiments, the network interface 402 can manage the assembling of an audio source or file into smaller packets that are to be transmitted over the data network or reassembles received packets into the original source or file. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, the network interface 402 can include one or both of a wireless interface 404 and a wired interface 406. The wireless interface 404, also referred to as an RF interface, provides network interface functions for the zone player 400 to wirelessly communicate with other devices (e.g., other zone player(s), speaker(s), receiver(s), component(s) associated with the data network 128, and so on) in accordance with a communication protocol (e.g., any of the wireless standards IEEE 802.11a, 802.11b, 802.11g, 802.11n, or 802.15). To receive wireless signals and to provide the wireless signals to the wireless interface 404 and to transmit wireless signals, the zone player 400 of FIG. 4 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software modules 414, which can be executed by the processor 408 to achieve certain tasks. In the illustrated embodiment, the memory 410 is a tangible machine readable medium storing instructions that can be executed by the processor 408. In some embodiments, a task might be for the zone player 400 to retrieve audio data from another zone player or a device on a network. In some embodiments, a task might be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks can be achieved via the one or more software modules 414 and the processor 408.

The audio processing component 412 can include one or more digital-to-analog converters (DAC), an audio preprocessing component, an audio enhancement component or a digital signal processor, and so on. In certain embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include necessary circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (for low frequencies), a mid-range driver (middle frequencies), and a tweeter (high frequencies), for example. An enclosure can be sealed or ported, for example.

A zone player 400 can also be referred to herein as a playback device. An example playback device includes a Sonos® Play:5, which is manufactured by Sonos, Inc. of Santa Barbara, Calif. The Play:5 is an example zone player with a built-in amplifier and speakers. In particular, the Play:5 is a five-driver speaker system that includes two tweeters, two mid-range drivers, and one subwoofer. When playing audio content via the Play:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from Internet radio stations, online music and video services, downloaded music, analog audio inputs, television, DVD, and so on, can be played from a Sonos® Play:5. While the Play:5 is an example of a zone player with speakers, it is understood that a zone player with speakers is not limited to one with a certain number of speakers (e.g., five speakers as in the Play:5), but rather can contain one or more speakers. Further, a zone player can be part of another device, which might even serve a purpose different than audio (e.g., a lamp).

IV. Example Controller

Figure 5:
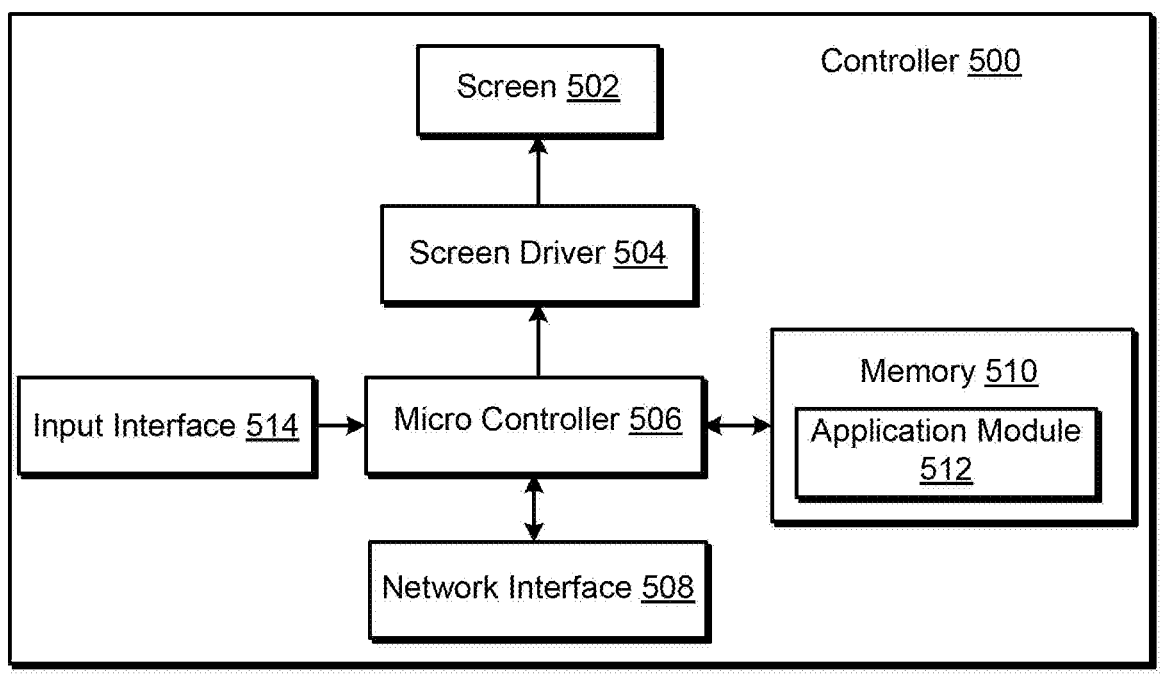
FIG. 5 shows an internal functional block diagram of an example controller.

Referring now to FIG. 5, there is shown an example controller 500, which can correspond to the controlling device 130 in FIG. 1. The controller 500 can be used to facilitate the control of multi-media applications, automation and others in a system. In particular, the controller 500 is configured to facilitate a selection of a plurality of audio sources available on the network and enable control of one or more zone players (e.g., the zone players 102-124 in FIG. 1) through a wireless network interface 508. According to one embodiment, the wireless communications is based on an industry standard (e.g., infrared, radio, wireless standards IEEE 802.11a, 802.11b 802.11g, 802.11n, or 802.15). Further, when a particular audio is being accessed via the controller 500 or being played via a zone player, a picture (e.g., album art) or any other data, associated with the audio source can be transmitted from a zone player or other electronic device to the controller 500 for display.

The controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system. Further, a controller can be integrated into a zone player.

It should be noted that other network-enabled devices such as an iPhone®, iPad® or any other smart phone or network-enabled device (e.g., a networked computer such as a PC or Mac®) can also be used as a controller to interact or control zone players in a particular environment. In some embodiments, a software application or upgrade can be downloaded onto a network enabled device to perform the functions described herein.

In certain embodiments, a user can create a zone group including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Point of Sale Environment

Figure 6:
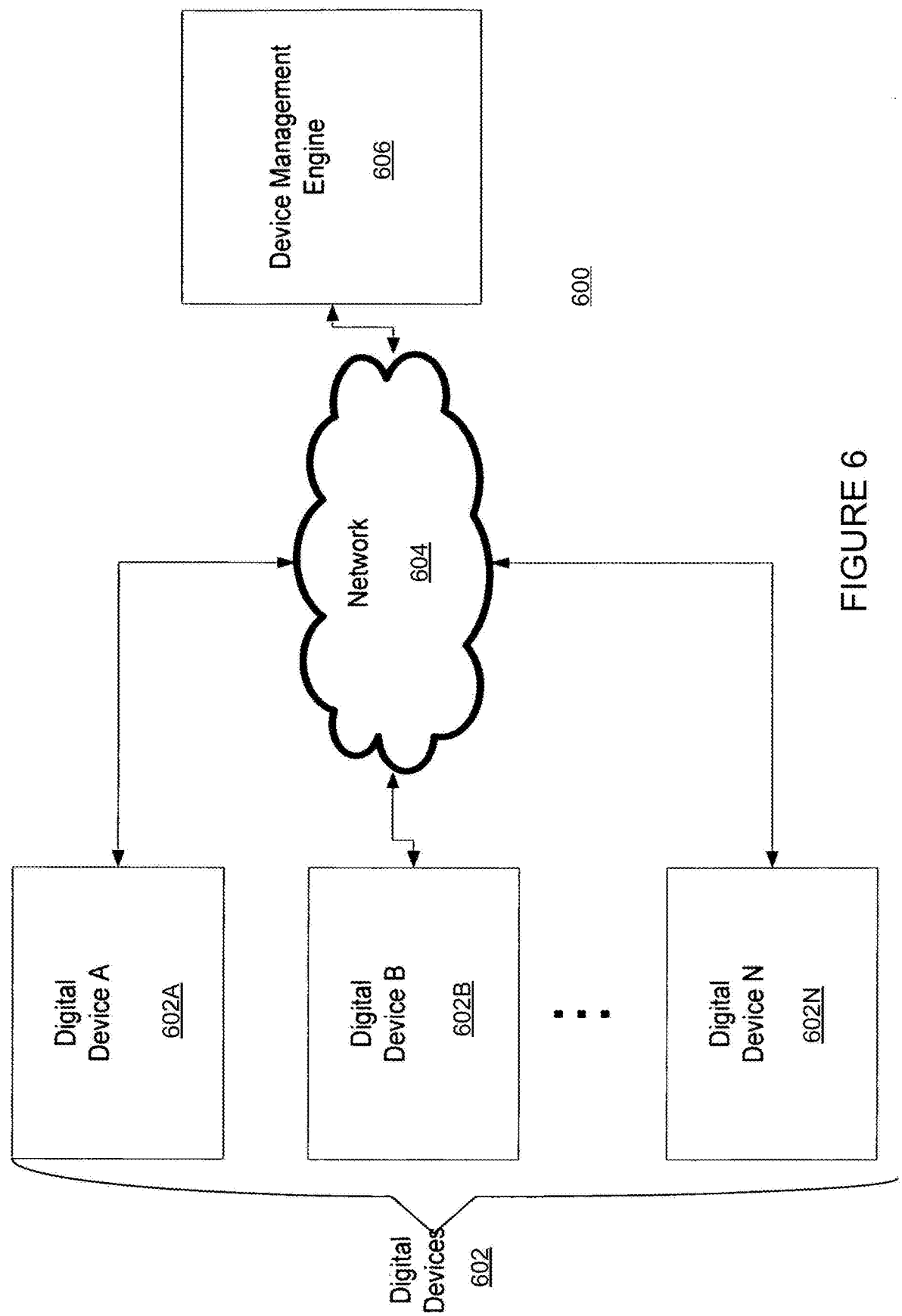
FIG. 6 shows an example point of sale environment for remotely managing digital devices in a retail environment.

FIG. 6 shows an example system 600 for remotely managing devices, such as playback devices (e.g., zone players) in a point of sale location. By way of illustration, a retail or other point of sale location may include a general retail store such as TARGET® or a specialty retailer such as BEST BUY®. Though it is understood that a retail environment as used herein could include any area with foot traffic (e.g., an airport or coffee shop to name a few), and as such, a retail environment may not necessarily be known for retail. An example system 600 includes a wireless, multi-room digital media system that lets you play digital music or other multimedia content in a house, business, vehicle or other location or area. The digital music system 600 may be controlled at the location via a single playback device, a controller, both a playback device and a controller, and so on. The playback device may be sold in a retail environment, such as an electronics store. The playback device may be monitored in order to provide updates, subscription service information, or any other automated data remotely to the system at the point of sale location.

As illustrated in the example of FIG. 6, one or more digital devices 602 (e.g., playback devices), such as a digital device A 602A, a digital device B 602B, and a digital device N 602N, are in communication via a network 604 with a device management engine 606. The digital devices 602 may be associated with a retail environment. The device management engine 606 may be associated with a manufacturer, distributor, and/or service provider for the digital devices 602. Although certain kinds of digital devices 602 are discussed herein, any type of digital device may be managed remotely according to some embodiments.

The digital devices 602 can access the device management engine 606 via the network 604, directly, or via a computing device, such as a laptop or desktop computer, a cellular telephone, a personal digital assistant (PDA), a set top box, and so on. In certain embodiments, the device management engine 606 monitors the digital devices 602 via the network 604. In an embodiment, the digital devices 602 may connect to the device management engine 606 periodically via the network 604 to be monitored. Alternatively, the digital devices 602 may connect when an event occurs, such as when a user activates an application on any of the digital devices 602 or attempts to log into a subscription service. In certain embodiments, any of the digital devices 602 may initiate communication with the device management engine 606. In certain embodiments, the device management engine 606 may initiate communication with one or more of the digital devices 602. In certain embodiments, the device management engine 606 may connect to one of the digital devices 602, which then monitors the other digital devices 602 through a local network, for example.

The digital devices 602 may be configured for demonstrations or other customer tests. Accordingly, some of the digital devices 602 may be demonstration units or have modes of operation that include a demonstration mode, for example.

Figure 7:
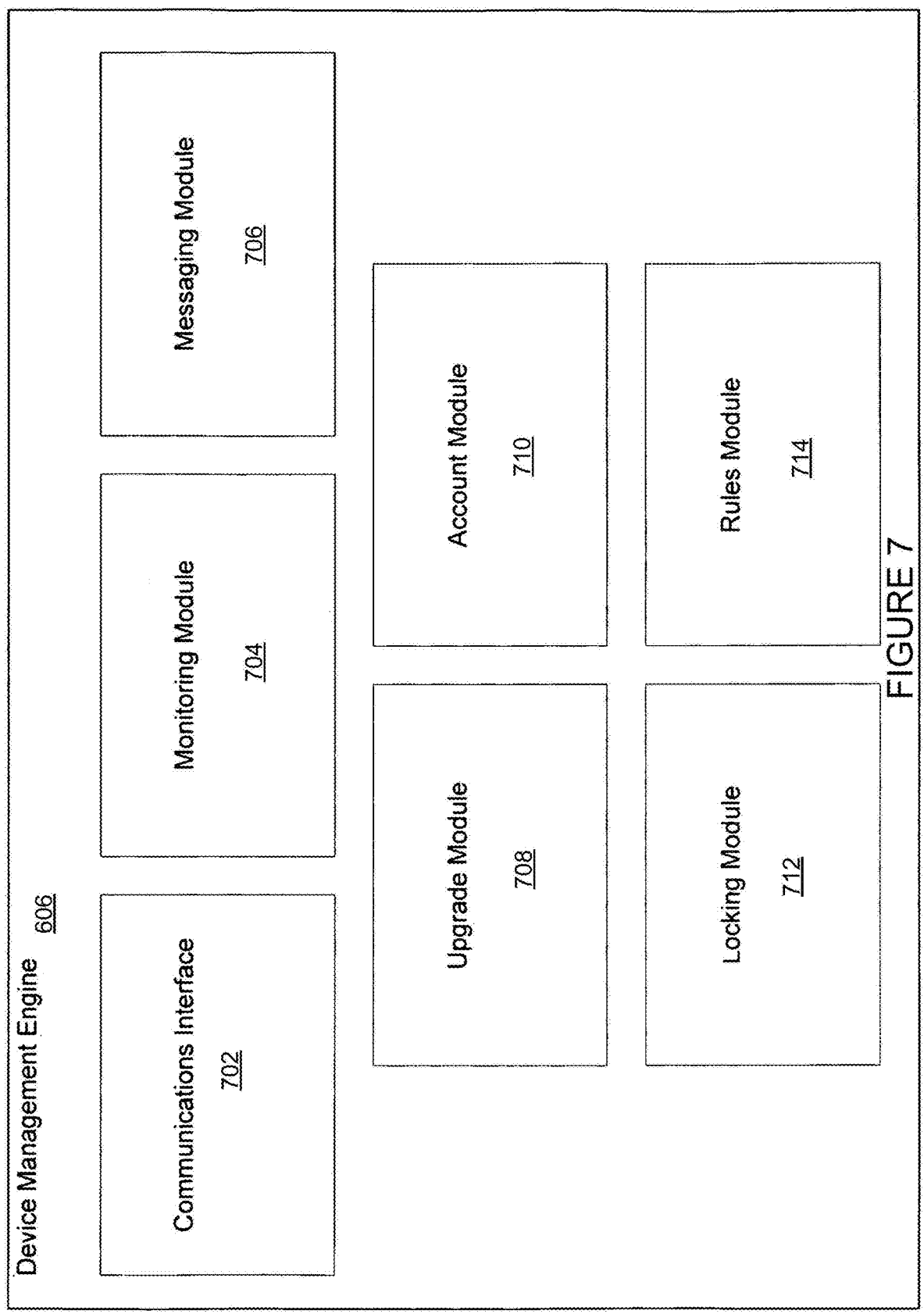
FIG. 7 is a block diagram of an example device management engine.

FIG. 7 is a block diagram of an example device management engine 706, such as or similar to the device management engine 606 shown in FIG. 6. The example device management engine 606 of FIG. 7 includes a communications interface 702, a monitoring module 704, a messaging module 706, a resolution module 708, an account module 710, and a locking module 712.

The communications interface 702 may facilitate communication between the device management engine 606 and the digital devices 702. For example, the communications interface 702 may communicate messages, such as emails, text messages, error messages, operational detail messages, software updates, and so on to the digital devices 702.

A monitoring module 704 may monitor the one or more digital devices 602 within the retail environment. The retail environment may include one or more retail stores. For example, a retail store may sell various digital music devices, digital video devices, and so forth. Various digital devices 602 in hundreds (or thousands) of stores may be monitored. The monitoring module 704 may schedule times for the device management engine 606 to connect to these digital devices 602 via the network 604. The monitoring module 704 may then track user interaction with the digital devices 602, demonstrations being played by the digital devices 602, input from sales people associated with the digital devices 602, software application versions running on the digital devices 602, functioning of the digital devices 602, whether the digital devices 602 are on or off, and so on. The digital devices 602 may push monitoring data to the device management engine 606 or the device management engine 606 may pull the monitoring data from the digital media devices 602. The monitoring may be event based, rather than, or in addition to schedule based. For example, the monitoring module 704 may monitor the digital media devices 602 when a dealer lock mode is enabled (discussed in further detail below), when a retailer makes changes to the configuration associated with the digital media devices 602, and so on.

Based on the monitoring, the monitoring module 704 may forward data obtained to one or more other modules associated with the device management engine 606, for example.

Optionally, a telephone call or other communication may be initiated by a person or machine associated with the device management engine 606 to inform a person or machine associated with the retail environment about matters, issues, problems, etc. detected at one or more of the digital devices 602. In certain embodiments, monitoring identifies an opportunity for an upgrade, which triggers the communications interface 602 to send an email to someone, such as a sales person, to visit the retail environment that merits the upgrade or is experiencing other problems with the digital devices 602 being monitored (e.g., problems with demonstration, connectivity, settings, and so on). In certain embodiments, the communications interface 602 sends the upgrade directly to one or more digital devices 602 that need or otherwise qualify for the upgrade.

In certain embodiments, digital devices 602 may identify themselves as retail units. The retail units may check in with the device management engine 606 to be monitored more frequently than other digital devices 602, for example. The retail units may be provided with different data from other digital devices 602 or otherwise be treated differently. Monitoring of the digital devices 602 may be utilized to identify various uses of the digital devices 602. For example, a profile for each of the digital devices 602 may be generated by the digital devices 602 or obtained from a third party. The profile may then be utilized to determine what type of uses, content, or other information associated with the digital devices 602 may result in increased sales, decreased sales, or other information associated with the retail environment. For example, retail store A may sell more of the digital devices 602, and the digital devices 602 sold at store A may have been used predominantly for Internet streaming. Features, settings, demographics, or other information associated with the digital devices 602 may be utilized to generate the profiles. Data from the profiles, or otherwise, may be utilized to determine sales trends.

A messaging module 706 may be provided to generate messages associated with the digital devices 602. The messages may include a resolution, such as an upgrade to software, remote reset, setting change, and so on, associated with the digital device 602. For example, a new version of an application on a digital video device may be provided. As another example, an updated version of an application for playing audio at a digital music device may be provided. The messaging module 706 may generate a message regarding the resolution, such as an upgrade, a message that the digital devices 602 is not functioning properly, such as being turned off or otherwise deactivated, a message with subscription or temporary access data, and so on. Any type of message may be generated by the messaging module 706.

A resolution module 708 may be provided in association with the device management engine 606. The resolution module 708 may use data from the monitoring module 704 to determine whether or not a resolution including an upgrade or update of software, or other upgrades, are required or may be useful to the digital devices 602 being monitored. As discussed herein, the digital devices 602 may be monitored periodically or continually via the network 604. The resolution module 708 may evaluate the data from the monitoring module 704 and determine what type of upgrade, or other resolution, to send to the digital device(s) 602. The resolution may be based on the data from the monitoring module 704 and data about the digital devices 602, itself, according to some embodiments. For example, a model number associated with the digital devices 602 may help determine the upgrade to be sent to the digital devices 602. The upgrade or other resolution may be scheduled or randomized to avoid simultaneous upgrades to relieve strain on the device management engine 606, according to some embodiments.

The resolution module 708 may send upgrades or other remote correction to the digital devices 602 based on new or updated demonstrations, new or updated audio or video tracks, bug or error fixes for existing applications, and so forth. Any type of data may be sent by the resolution module 708. In certain embodiments, the resolution module 708 instructs a digital device 602 to activate itself, such as by turning itself on or registering with the device management engine 606. The resolution module 708 may also make the upgrades available to the digital devices 602, such as by providing downloadable upgrades.

An account module 710 may be provided to register the digital devices 602 with subscription services. The account module 710 may send subscription data, such as temporary login information, to the digital devices 602. Alternatively, the account module 710 can auto-populate a subscription registration for the digital devices 602 or otherwise automatically register the digital devices 602 for the subscription services. For example, the account module 710 may provide the digital devices 602 with a username and password for online service accounts, such as for a music download service. In certain embodiments, the account module 710 sends account information to the digital devices 602 periodically so the digital devices 602 can maintain current demonstration data. For example, the account module 710 can send subscription data to the digital devices 602 each month based on popular websites or services for the particular month.

In certain embodiments, the device management engine 606 may act as a proxy for the digital media devices 602 by communicating directly with a subscription service about a particular digital media device 602. For example, the device management engine 606 may communicate to the subscription service that digital media devices 602 with particular household identification numbers (or other identification information) are approved for trial accounts.

In certain embodiments, each digital devices 602 and/or retail store may be provided with subscription data, such as a trial account, for example. For example, the account module 710 may provide the subscription data. The trial account may be customized for the digital devices 602 according to profile data associated with the digital devices 602, retail store location, or any other information. For example, digital devices 602 in retail stores in a Midwest region may have trial accounts for country music set up or prepopulated.

In certain embodiments, a locking module 712 may also be provided. The locking module 712 may send data to the digital devices 602 to lock the digital device 602 in a particular state. For example, the locking module 712 may remotely limit changes to settings associated with the digital device 602. In alternative embodiments, a locking mechanism may be provided on the digital devices 602, itself.

According to various embodiments, the locking mechanism may limit changes, return the digital devices 602 to a state so that a consistent presentation is displayed for another customer, prevent the deletion of files or applications, prevent certain content from being played or displayed, and so on. For example, particular streaming content may be prevented from playing in the retail environment because it is not all-age appropriate. The locking mechanism may be implemented for any reason. The locking module 712 may remove or deactivate the locking mechanism for any reason, such as when the customer purchases the digital devices 602.

A rules module 714 may also be provided. The rules module 714 may determine a course of action when an event occurs, such as what type of resolution is appropriate, what default settings are appropriate based on registered users, registered retailers, and so on. Specific resolutions may be provided based on rules associated with the rules module 714. For example, if the digital media device 602 is registered to a particular retailer, specific upgrades with preset features may be provided to the digital media devices 602 associated with the particular retailer. A variety of rule types may be established by the rules module 714. According to example embodiments, the rules module 714 may be updated with current rules data based on updates associated with retailers, the device management engine 606, the digital media devices 602, and so on.

Although various modules are shown in FIG. 7 as part of the device management engine 606, the device management engine 606 may be formed from less than or more than the modules shown and still fall within the scope of various embodiments. For example, a retail profile database (not shown) may be provided for storing data about individual retail environments. Further, although FIGS. 6 and 7 detail the use of the digital devices 602 in retail environments, the digital devices 602 may be remotely managed within residential environments or other commercial environments. For example, the monitoring module 704 may monitor digital devices 602 in homes of users for providing remote resolutions, such as error fixes, upgrades, on/off indicators, account updates, and so on.

In an embodiment, a retail store may register one or more of the digital devices 602 for management by completing an online registration process with the device management engine 606. The device management engine 606 provisions the digital devices 602 and the digital devices 602 are monitored and/or check in with the device management engine 606 periodically. Data from the digital devices 602 may be extracted and forwarded to subscription service providers that may then enable one or more trial accounts based on the data from the digital devices 602, such as a trial or demonstration account from a music or other multimedia content service provider.

In certain embodiments, if one or more of the digital devices 602 fails to check-in with the device management engine 606 for a period of time (e.g., fourteen (14) days) the digital devices 602 may be deemed "inactive." Any trial accounts associated with the digital devices 602 deemed "inactive" may be disabled.

Figure 8:
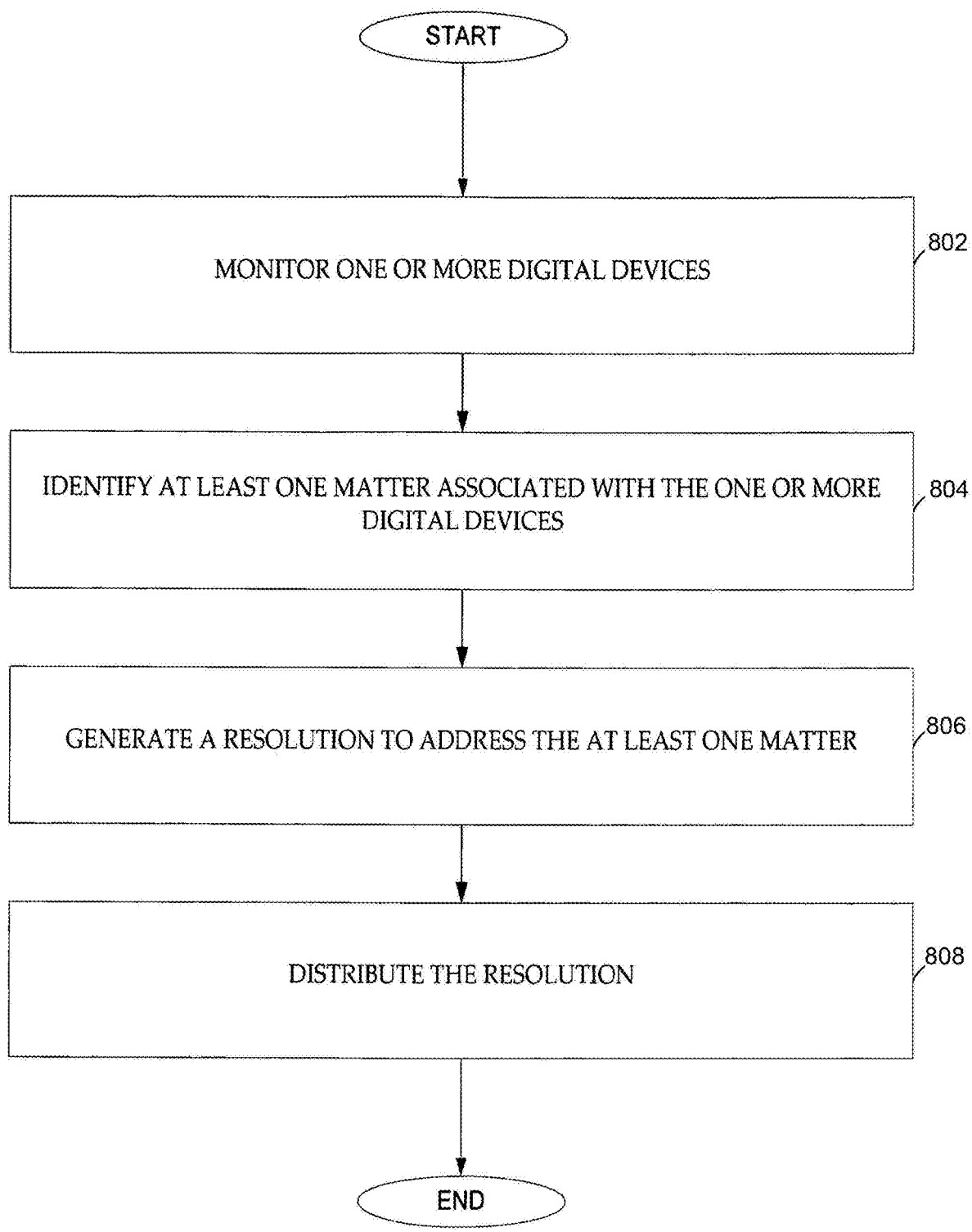
FIG. 8 is a flowchart of an example process for remotely managing digital devices.

FIG. 8 is a flowchart of an example process for remotely managing digital devices, such as the digital devices 602 discussed herein. The digital devices 602 may include digital music devices or digital media devices according to certain embodiments. At block 802, one or more of the digital devices 602 are monitored. As discussed herein, the device management engine 606 may monitor the digital devices 602 within a retail environment, a residential environment, a commercial environment, or other environment. The digital devices 602 may be monitored via the network 604 on a periodic basis or constantly. In certain embodiments, a retailer, a user, or other person may request or set the frequency with which the digital device(s) 602 is monitored. In certain embodiments, the digital device(s) 602 itself specifies the frequency for monitoring.

At block 804, at least one matter associated with the one or more digital devices 602 is identified. For example, the resolution module 708 may identify the matter. The matter may include an available upgrade, a bug or error associated with an application on the digital devices 602 (e.g., an error detected in demonstration playback, networking, and so on), a lock to prevent particular content from being available on the digital devices 602, availability of an up-to-date demonstration, availability of subscription information for a subscription service, an operational problem, such as the device being turned off, and so on. The matter may be identified based on availability of new or up-to-date data for the digital devices 602, based on requests from the digital device or users associated with the digital devices 602, and/or based on data about the environment, such as a retail, residential, or commercial environment.

At block 806, a resolution to address the at least one matter is generated. For example, the messaging module 706 may identify the resolution. As discussed herein, based on the data about the environment and/or the digital devices 602, the digital management engine 606 may send upgrades, messages, setting limitations or changes, instructions, subscription account information, such as temporary logins and passwords, and so on. A variety of resolutions may be sent or otherwise communicated to or about the digital devices 602.

At block 808, the resolution is distributed. The resolution may be distributed directly to the digital devices 602 or to other devices associated with the environment, such as servers, computing devices, and so on. In certain embodiments, one of the digital devices 602 receives the resolution and distributes the resolution to the other digital devices 602 in the same location or otherwise associated with the same environment. For example, in a user's home, one of the digital devices 602 may distribute upgrades to the other digital devices 602 in the same home. Accordingly, once one unit (e.g., digital devices 602) upgrades, the other units may also upgrade.

Similarly, the digital devices 602 associated with similar retail environments may also receive resolutions based on the resolution sent to one of the digital devices 602, so that a digital device 602 at one of the retail locations perpetuates the resolutions to the digital devices 602 to one or more retail environments associated with the retail location. In alternative embodiments, each of the digital devices 602 may receive the resolution.

V. Demonstration at a Point of Sale Display

Figure 9:
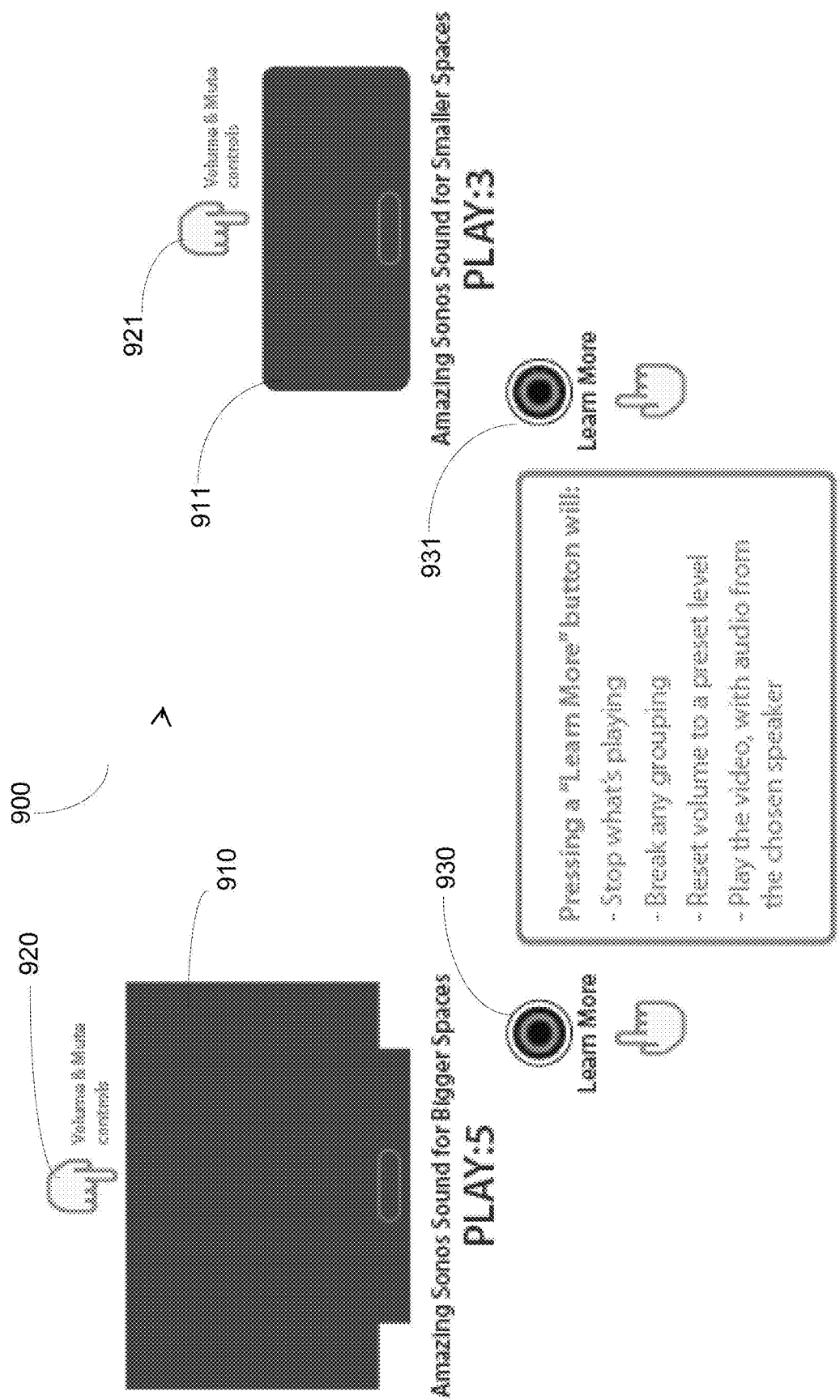
FIG. 9 shows a demonstration interface configured for demonstration of operation of one or more playback devices in a retail environment.

As shown in FIG. 9, a demonstration interface 900 is configured for demonstration of operation (e.g., multimedia content playback) of one or more playback devices 910, 911 in a retail environment. The playback device or zone player 910, 911 has volume and other controls 920, 921 accessible via the interface 900 to provide a user with additional information and control for demonstration of the playback device 910, 911. As shown in FIG. 9, demonstration scripts can be configured for a plurality of demonstration devices 910, 911 so that a user can demonstrate and test a playback system in a retail environment. The user can select a device 910, 911 via the interface 900 to interact with the device 910, 911 to retrieve further information, exercise volume and mute controls, and experience other demonstration features, for example.

As shown in FIG. 9 an example PLAY:5™ device 910 and an example PLAY:3™ device 911 are provided via the interface 900. A user can interact with the interface 900 and device(s) 910, 911 to learn more and interact with the system to determine, for example, quality of sound and playability of audio or other multimedia content. In certain embodiments, the devices are networked together at the demonstration interface 900 using the same network topology as the devices would use in its intended environment (e.g., at home or in some other environment).

Each device 910, 911 is associated with a "Learn More" button or icon 930, 931. For example, pressing a learn more button 930, 931 may provide one or more of the following options: stop what is playing, break any grouping, reset volume to a preset level, play video with audio from a chosen speaker, and so on. In certain examples, after a certain period (e.g., three minutes) without user interaction, the system may timeout and revert back to a zone menu. In certain examples, after a video begins, any "learn more" button presses 930, 931 is ignored for a certain period of time (e.g., five seconds).

Figure 10:
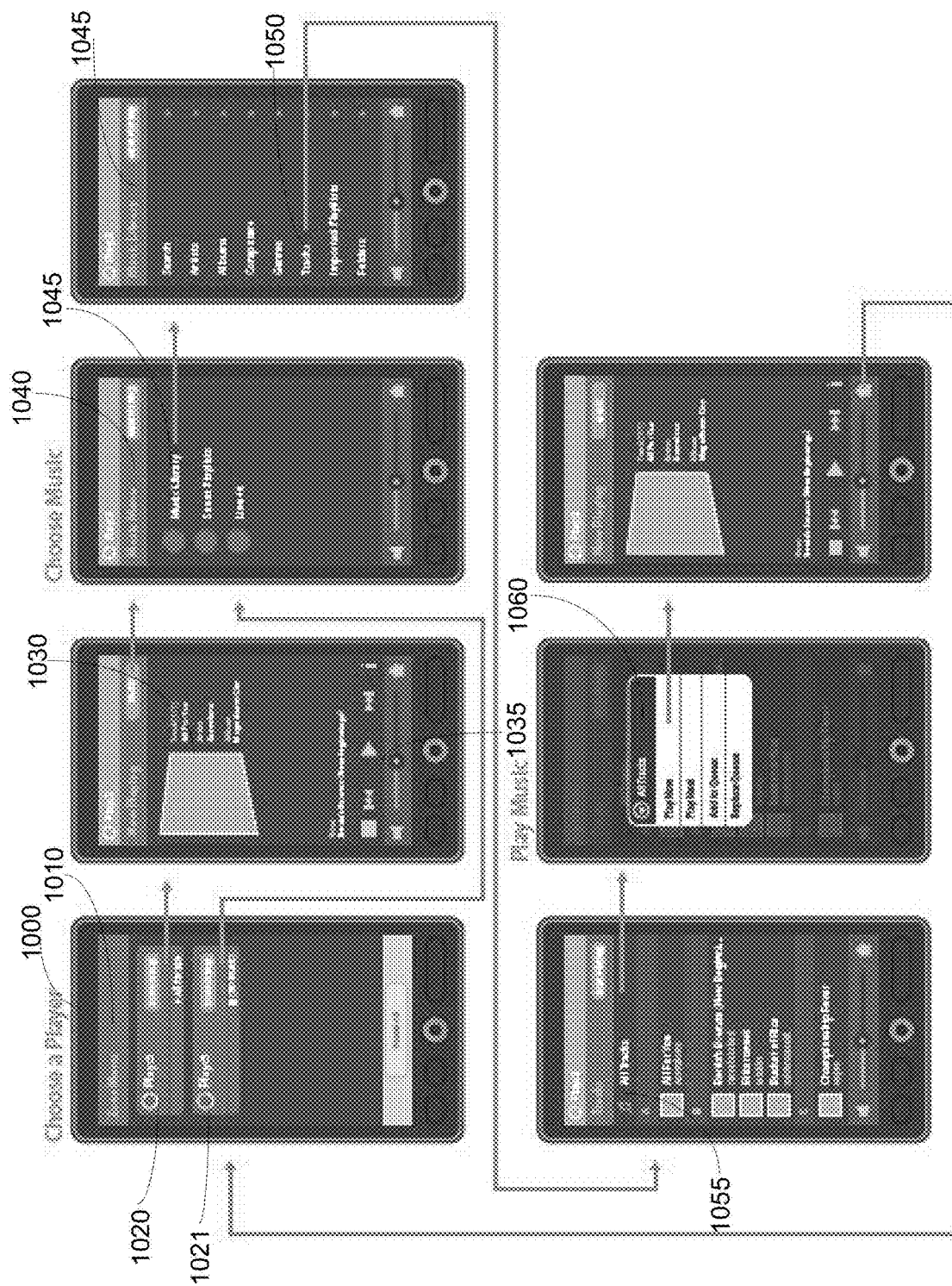
FIG. 10 shows an example handheld device that can be used to provide controller functions for one or more demonstration playback devices.

As shown in FIG. 10, a handheld device 1000, such as a smartphone (e.g., an Apple iPhone™, a BlackBerry™, an Android™ phone, and so on) or tablet computer (e.g., an Apple iPad™, BlackBerry PlayBook™, and Samsung Galaxy™, and so on), can be used to provide controller functions for one or more demonstration playback devices. As shown in FIG. 10, a user can choose a zone player 1020, 1021 via a zone menu 1010 on the mobile device 1000. After selecting a zone player 1020, 1021, the user can view content 1030 playing on the zone player 1020, 1021 to interact with one or more controls 1035 to control playback volume speed, etc. Using the controller 1000 for the selected zone player 1020, 1021, the user can select music 1040, such as from a streaming music service via the Internet, the retail store's own music service, an available music library, playlists, and/or auxiliary line in, digital music files stored on a portable device of a potential customer, and so on. Selecting the music library 1045, for example, provides the user with a demonstration set of library features including search, artists, albums, composers, genres, tracks, imported playlists, folders, and so on. Selecting tracks 1050, for example, provides the user with a listing of available tracks. For example, available tracks may include all tracks, tracks corresponding to a certain letter of the alphabet, other indicated tracks, and so on. Selecting all tracks 1055, for example, provides an additional menu 1060 allowing the user to select from among a plurality of options including, for example, play now, play next, add to queue, please queue, and so on. Selecting play now, for example, plays the track through the one or more selected zone players 1020, 1021 and allows the user to impact that play experience through the handheld control 1000, for example. Selecting a home option 1065 in the controls 1035 brings the user back to the zone menu 1010, for example.

In certain embodiments, a demonstration system is configured and provided at a point of sale display to facilitate demonstration and playback to potential customers in a connected or a non-connected environment. User experience guidelines can be provided for both connected (e.g., network-accessible) and non-connected (e.g., non-network accessible) retail display.

In certain embodiments, a default screen mode can be provided for one or more playback devices in demonstration arrangement at a retail location. For device(s) in a non-connected environment, a default screen mode can be implemented after one minute of non-use, for example. For device(s) in a connected environment, a default screen mode can be entered after ten minutes of non-use, for example. A default screen can provide an image indicating "Touch To Play Music", for example. Upon a user touch, the user is provided with a music menu for content playback, as shown above with respect to FIG. 9, for example. If a customer clicks on a "zone" logo, for example, the customer will be provided with a list of available zones (e.g., "S3-Kitchen", "S5-Office" and "Zone Player 120—Living Room") in the display. Thus, playback device models can be displayed in conjunction with room designations for user review and selection to determine operation and arrangement of device(s).

In certain examples, one or more demonstration devices can be locked such that certain functionality is limited or rendered off-limits. For example, a party mode can be enabled for playback device configuration, but a stereo pair option may not be offered as a demonstration option. In certain examples, a customer may not be allowed to shut off a device, and the device (e.g., a playback device, a controller, and so on) is "always on". For example, a controller application (e.g., a Sonos Android™ controller application) can be the only functionality enabled on a smartphone provided for demonstration purposes at a point of sale (e.g., a retail location). Other functionality may be locked or temporarily disabled to help prevent malfunction or tampering of the demonstration.

In certain embodiments, a series of commands is provided to allow an authorized user to access settings and lock or unlock a point of sale (POS) mode. For example, by touching two logos simultaneously, settings can be accessed. For example, settings can allow the authorized user to access language preferences and also be able to switch between connected and non-connected functionality should a store or other retail location gain Internet connectivity.

In certain embodiments, a non-connected demonstration set-up provides the following, in order of priority. For example, the user interface shows a default user interface and an icon for tier 1 music services (e.g., Pandora™, Rhapsody™, Last.fm™, Napster™, I heart radio, Sirius/XM™, and so on). A music library is pre-loaded licensed music in, for example, fifteen second samples. An advertising message for music services (e.g., "Connect Sonos™ to the Internet and listen to more than 100,000 internet radio stations, shows, and podcasts from all over the world.") can be displayed. However, music services may not be simulated on a non-connected display. In certain examples, Internet Radio can be advertised (e.g., "Search for your favorite station, shows, or regional programming").

In certain embodiments, a connected demonstration set-up provides the following, in order of priority. For example, an application remains locked so users may not check email or access inappropriate information from the Internet. It is not desirable for customers to access settings, factory resetting the system, and so on, so a network connected demonstration configuration at a POS dictates that hardware and software run in a POS mode in which default settings for POS are not accessible to a potential customer. For example, a settings button can indicate to consumers "Sorry, this is locked on all Sonos retail displays". Other buttons may be blocked to limit some functionality (e.g., Twitter™, alarm functionality, and so on).

In certain examples, a controller application (e.g., a controller application enabled on a smartphone, such as an Android™ controller application) utilize a lock default settings mode for a POS demonstration. In lock default settings mode, the user interface provides a control application that stays "locked" when users back out from a demonstration menu to a basic menu. The locked application prevents customers from changing settings, zones, names, groups zones, and so on. The application can default to a basic network configuration when powered down and re-launch a basic user interface when powered up to help ensure that the display is functional without a sales person rebooting the demonstration device. Demonstration hardware can include a personal music player that looks and acts like a phone, or a tablet device, for example.

In certain embodiments, demonstration display and sound are configured for a POS to entice customers to test and purchase a multimedia playback system. For example, a video screen can run a short brand video that will loop so the recording can tell a story regarding the product, the brand, and so on. A push button on the display allows a consumer to go deeper into the brand story and receive more involved messaging, for example. The button can be positioned on a touch screen, for example, and video screen so there is no confusion as to what controls the screen. In certain embodiments, the consumer can establish a connection (e.g., over the Internet) with a representative from sales, customers service, and so on for the multimedia playback system.

In certain embodiments, via the connection though the demonstration system, the consumer can converse with a representative associated with the playback system rather than someone working at the point of sale.

In certain embodiments, if a customer decides to switch from the controller application and explore deeper on the demo video screen, sound parameters can reflect a direction of the user's exploration. Sound from the video can emanate through a playback unit, such as a Sonos S3™, housed directly below the video screen. By activating the controller device touch screen, sound from the streaming video (e.g., Sonos PLAY:5™) can be cut off, allowing the music to play from either device, such as the Sonos PLAY:3™ or Sonos PLAY:5™. In certain embodiments, the interaction can begin with the PLAY:5 and then allow a customer to switch to the PLAY:3.

In certain embodiments, a non-connected environment at a POS can be managed such that a manufacturer of one or more playback devices configured for demonstration at the POS (e.g., a Sonos PLAY:3™ and a Sonos PLAY:5™) can maintain control of setup and messaging for the demonstration devices in a non-assisted sales floor environment. For example, wireless setup, control, and interference prevention can be facilitated in a non-network connected environment at a POS. An educational demonstration can be enabled via the playback devices and controlled by the manufacturer. Audio content can be controlled to help ensure a high level of audiophile quality in the demonstration, for example. Additionally, a POS display can be provided for demonstration to promote consumer engagement and interaction with a family of playback devices (e.g., music players).

In certain embodiments, a playback device, such as a Sonos PLAY:3™ music player, may not include an auxiliary input to provide audio content for in-store demonstration at a non-connected POS. As a result, the playback device can be configured with one or more other devices to facilitate in-store demonstration according to manufacturer specifications.

Figure 11A:
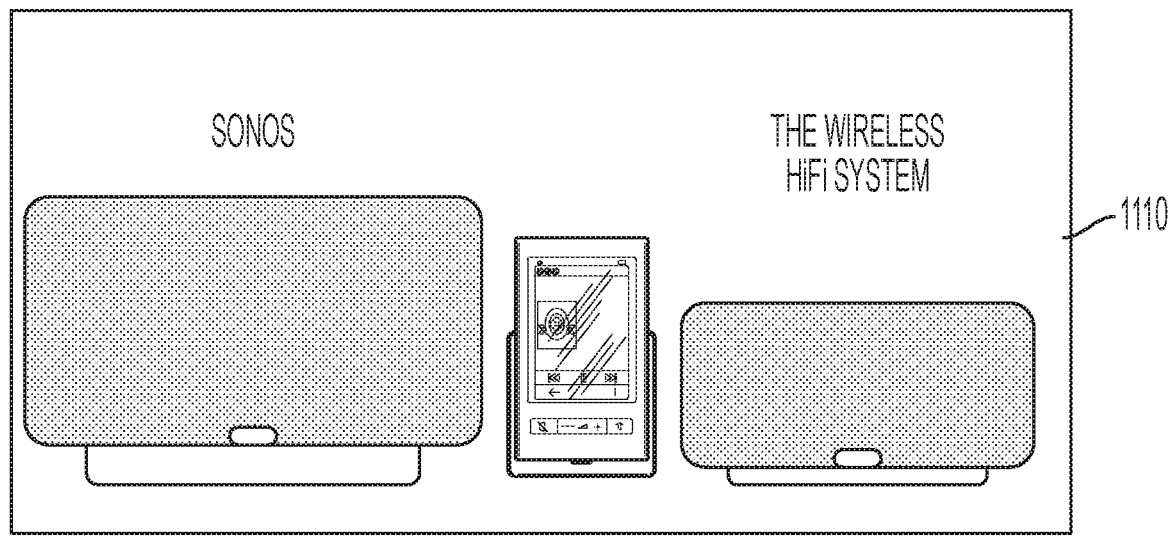
FIGS. 11A-11F illustrate example demonstration configurations of one or more playback devices at a point of sale display.
Figure 11B:
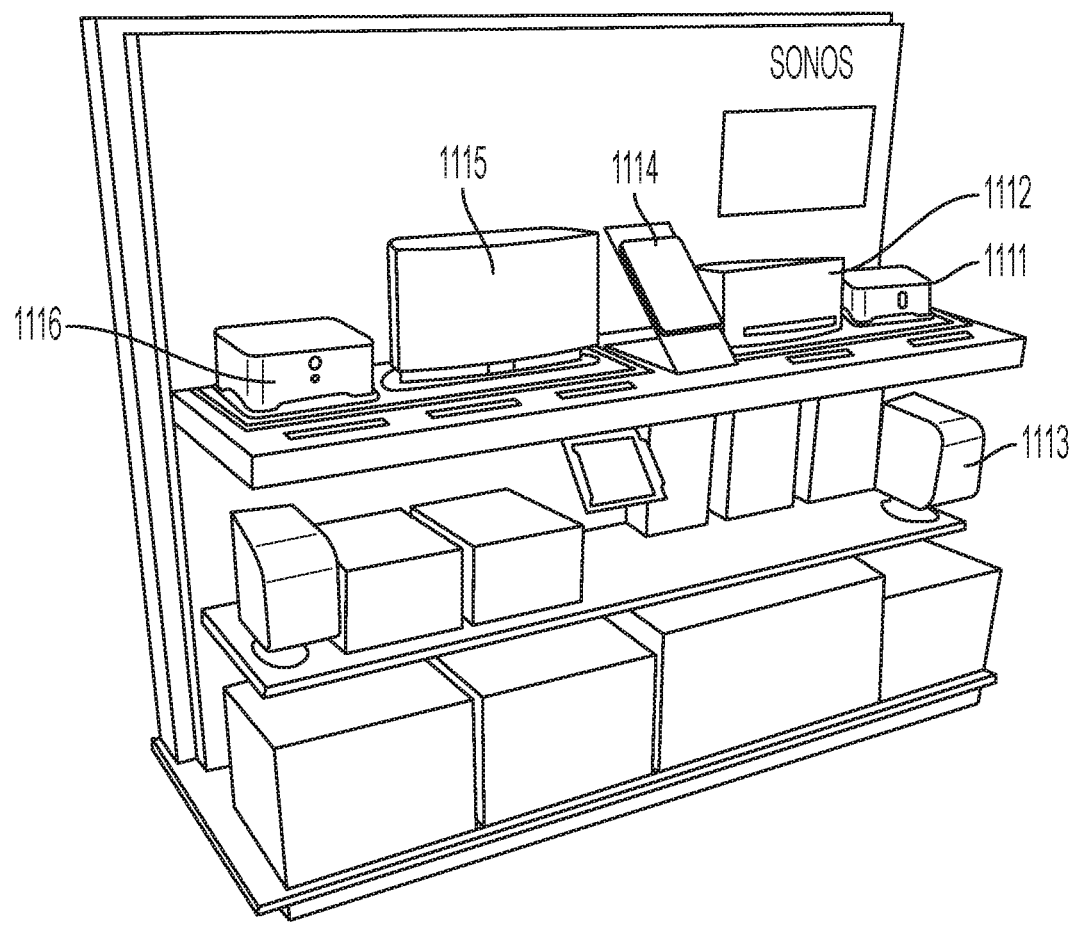
Figure 11C:
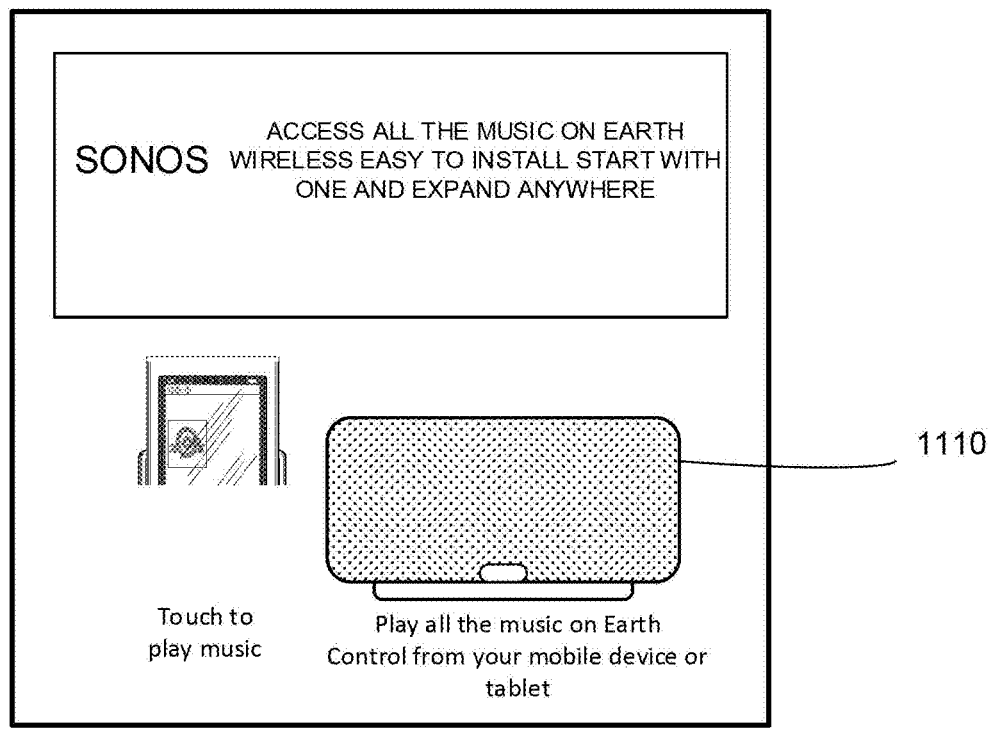

For example, a playback device without an auxiliary input can be displayed for demonstration in conjunction with a demonstration display for one or more other playback devices with an auxiliary input. As shown, for example, in FIGS. 11A-11C, existing electronics from another system's demonstration display 1110 can be used for the demonstration of the new playback system at the POS. As illustrated, for example, in FIG. 11B, a plurality of different playback devices 1111-1116 can be arranged and networked to allow a customer to learn about and test a variety of playback devices 1111-1116 in a demonstration configuration.

Figure 11D:
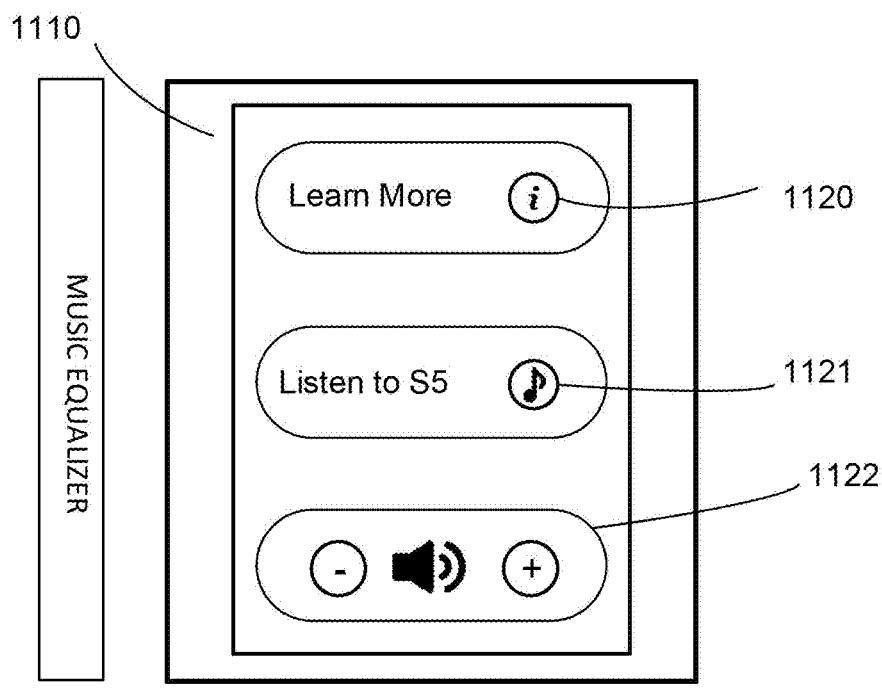

As shown, for example, in FIG. 11D, one or more buttons 1120-1122 can be adjusted son the display 1110 so that the buttons communicate with both types of playback device. For example, the top button 1120 can be configured as a "Learn More" button about a first type of playback device, and the middle button 1121 can be configured as a "Learn More" button about a second type of playback device. A volume control 1122 can work the same for each type of playback device and can be used to control either device, for example.

Figure 11E:
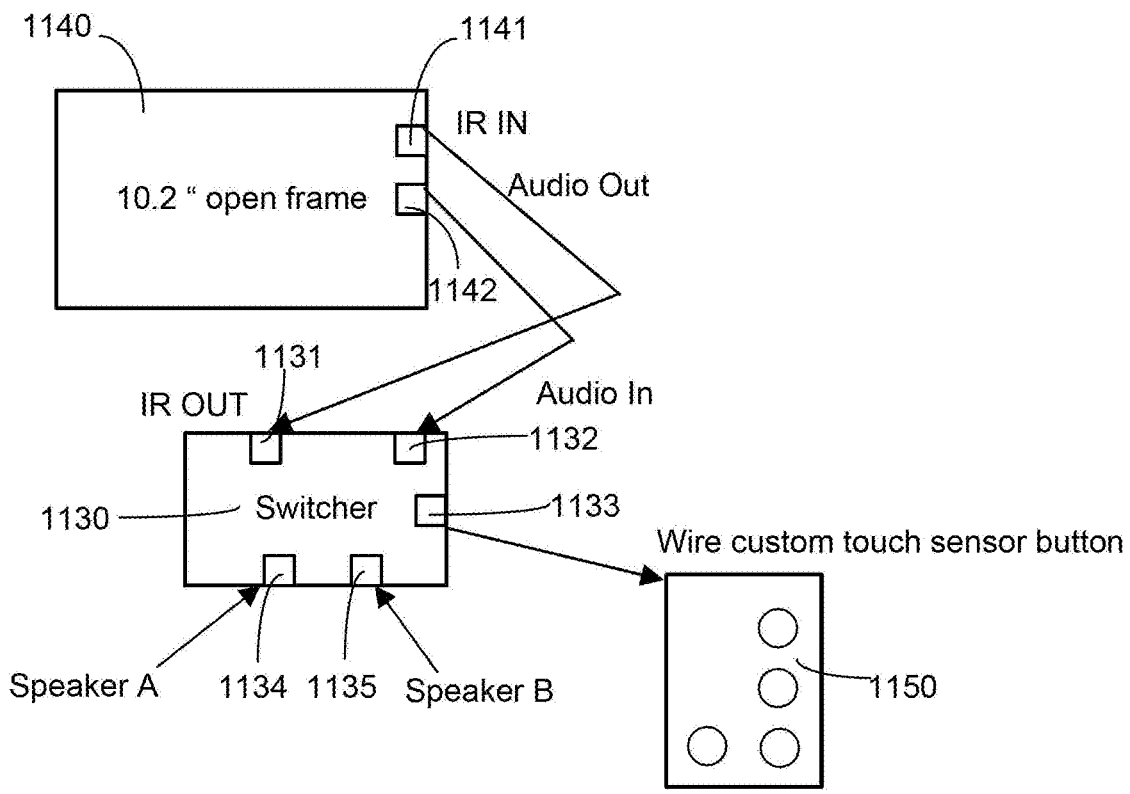

FIG. 11E depicts a switching box or switcher 1130 to allow an auxiliary input to work with either device via a display. In certain embodiments, an auxiliary output can be changed to audio over Ethernet or other network connection/adapter, for example. In certain embodiments, electronics can be added (e.g., via a retrofit box, up front, and so on) to connect a plurality of playback devices and provide audio over Ethernet capability for demonstration at a POS. For example, audio over Ethernet technology can be built into POS electronics up front to help reduce or minimize retrofit issues and costs.

For example, as illustrated in the example of FIG. 11E, a playback device 1140 can be connected to the switcher 1130, such as by tying an infrared (IR) input 1141 of the device 1140 to an IR output 1131 of the switcher 1130 and an audio output 1142 of the device 1140 to an audio input 1132 of the switcher 1130. The switcher 1130 is connected to a touch sensor button or button panel 1150 via a connector 1133 to allow playback via one or more speakers 1134, 1135, for example.

Figure 11F:
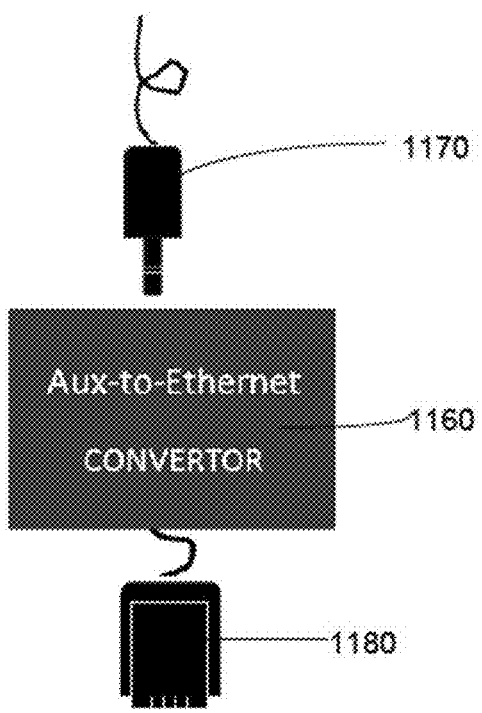

FIG. 11F illustrates a demonstration configuration of one or more playback devices at a POS without a demonstration display. A converter 1160 converts an auxiliary audio input 1170 to an audio over Ethernet signal 1180, for example. In certain embodiments, the converter 1160 can be implemented using a playback device, such as a modified Sonos ZP90™.

Using one or more of the example systems described above, one or more POS modes are enabled for playback device demonstration. For example, a POS mode can lock a playback device into an auxiliary input with volume and mute locked in at a high level and volume buttons that do not respond to user presses. As another example, a POS mode can include a playback device locked into an auxiliary input with volume and mute not locked and instead function as they normally would for the playback device.

In certain embodiments, a connected point of sale can be remotely updated. For example, audio, video, or audio and video content can be loaded to a POS playback device on demand and a new promotion can be run at a POS without having to put people on the ground in stores. Once a point of sale is connected, interaction with customers can be enabled (e.g., via video chat with a sales representative and so on). In certain embodiments, user interactions and locations can be tracked in real time from a central location. A report can then be generated (e.g., a report on a number and type of interactions that have occurred).

In certain embodiments, a customer can provide his or her own device (e.g., an iPod™ iPhone™, other portable device, and so on) to be connected via a dock or other interface (wired or wirelessly) to the POS display itself or to a playback device at a POS display so that the user can control or provide content for the POS playback device(s), or both control and provide content for playback via the user's portable device and the POS playback device(s). For example, a user may connect her iPhone™ to the POS display interface (docked or wirelessly "docked" via Bluetooth or some other wired or wireless networking protocol) and access her music stored on the phone device and/or access music through her subscribed music service even if the POS display is non-connected. As such, she can play a familiar song through a playback device, for example, to test the output of the one or more POS playback devices.

In certain embodiments, she may download controller software to her phone near the POS display location (e.g., via a phone network or via a local wired or wireless network of the POS display) and use the installed controller software on her phone to control one or more of playback devices at the POS display. How-to instructions may be provided at the POS display to walk her through the process of downloading the controller software and/or configuring the controller to control a playback device at the POS display. Downloading the controller at the store and using it to control limited (or all) functionality of a playback device, while under the guidance of the POS display, can provide an even more realistic experience with the hardware/software of the devices to be sold. In certain embodiments, after a reasonable amount of time has been reached (e.g., 10 minutes), the controller on her phone may be automatically disconnected from the POS display. In certain embodiments, the controller on her phone may be disconnected from the POS display and/or overridden by subsequent button presses on the POS display itself (e.g., thereby indicating that a new consumer has come to the POS display). While the controller may be deactivated from operating playback devices at the POS display, the controller may be configured to control any future playback devices that she decides to later purchase.

While example playback devices and POS demonstration systems have been illustrated in the preceding figures, one or more of the interfaces, data structures, elements, processes and/or devices illustrated in the figures can be combined, divided, re-arranged, omitted, eliminated and/or implemented in any way. Further, the example components described above can be implemented by hardware, software, firmware and/or any combination of hardware, software and/or firmware. Thus, for example, any of the example elements described above could be implemented by one or more circuit(s), programmable processor(s), application specific integrated circuit(s) (ASIC(s)), programmable logic device(s) (PLD(s)) and/or field programmable logic device(s) (FPLD(s)), and so on.

When any apparatus claim of this patent is read to cover a purely software and/or firmware implementation, at least one of the example elements are hereby expressly defined to include a computer readable medium such as a memory, DVD, CD, and so on, storing the software and/or firmware. Further still, the example elements can include one or more elements, processes and/or devices in addition to, or instead of, those illustrated in the figures, and/or can include more than one of any or all of the illustrated elements, processes and devices.

Figure 12:
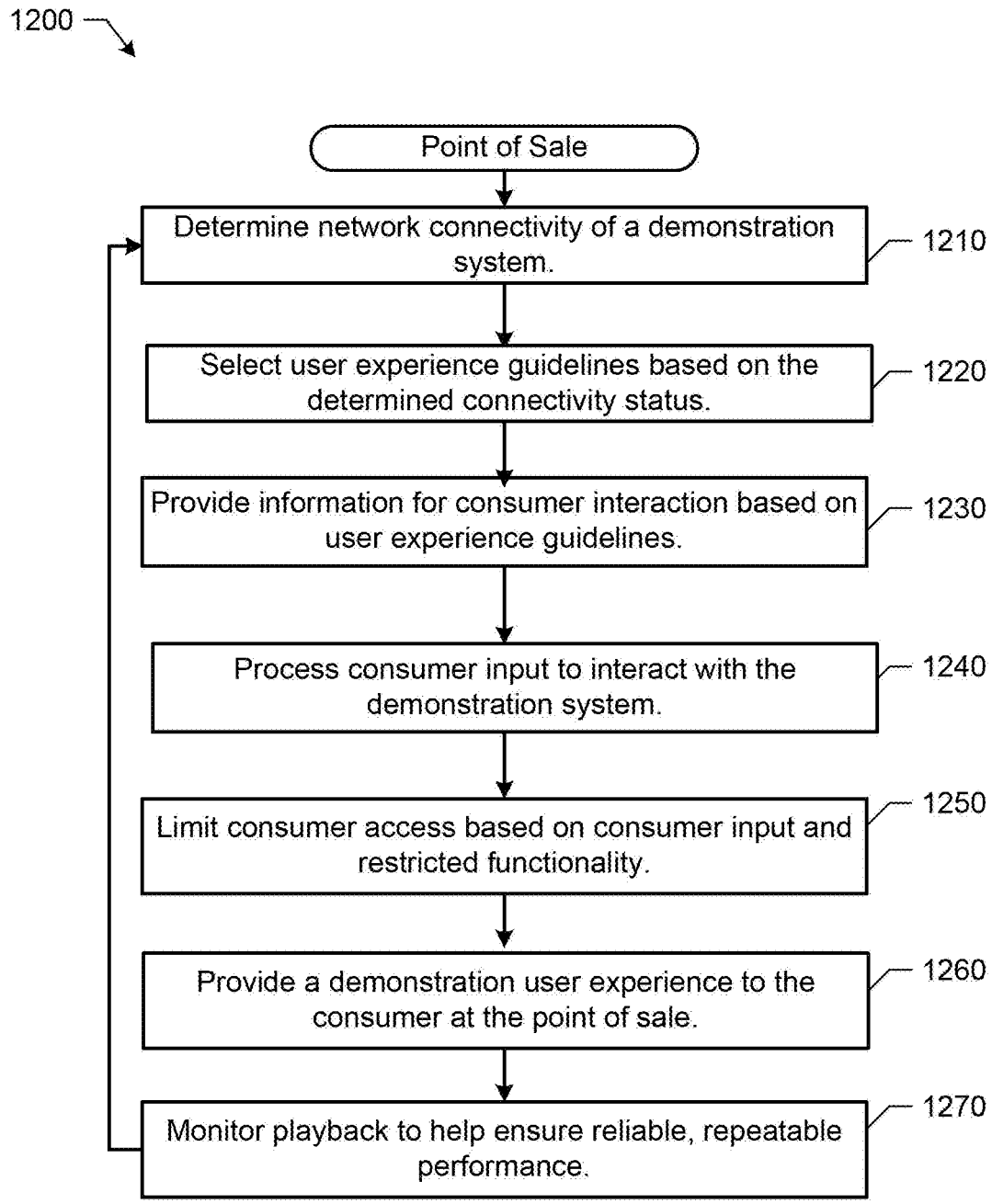
FIG. 12 shows a flowchart representative of an example method for playback device demonstration at a point of sale display.

FIG. 12 illustrates a flow diagram 1200 for a method of playback device demonstration at a point of sale. At block 1210, connectivity of a demonstration system to a network is determined. For example, it is determined whether a zone player demonstration station at a retail location (e.g., an electronics store) is connected to the Internet or is a stand-alone or temporarily disconnected system.

At block 1220, user experience guidelines are selected based on the determined connectivity status. For example, based on whether the demonstration system is connected or not connected to a network, operation and control of the demonstration playback device(s) can be adjusted to help ensure playable, usability, and reliability of the demonstration setup for repeated consumer interaction.

At block 1230, demonstration information and functionality are provided for consumer interaction at a point of sale based on the user experience guidelines. For example, a video or audio describing the demonstration playback devices, an alphanumeric descriptive display, and so on can be provided for consumer review. The consumer can also access functionality to play content and so on via the demonstration configuration. In certain embodiments, one or more buttons are provided for the consumer to learn more about a device or device capability. In certain embodiments, a handheld controller, such as a smartphone controller, can be provided to facilitate consumer interaction with the point of sale demonstration device(s).

At block 1240, consumer input is processed to interact with the demonstration system. For example, the consumer can review available content, select content for playback, adjust volume, and so on via a user interface associated with the demonstration system (e.g., a multi-button control panel) or other controller (e.g., a handheld smartphone controller application). The user interface/controller receives consumer input and relays it to an appropriate playback device, switcher, or control program, for example.

At block 1250, consumer access is limited based on the consumer input and restricted functionality. For example, a requested consumer action can be compared to a set of available or allowable consumer actions to determine whether the consumer is allowed to execute the action in the demonstration configuration. For example, a consumer may not be allowed to exit a controller program to open a web browser or email program in the demonstration system. As another example, a consumer may not be allowed to add additional content for playback, adjust volume beyond a defined range, and so on, in the POS demonstration environment.

At block 1260, a demonstration user experience is provided to the consumer at the retail location. For example, a consumer can listen to music via a demonstration zone player at a point of sale, such as an electronics store.

At block 1270, demonstration playback is monitored to help ensure reliable performance and configuration at the point of sale. For example, if no user interaction is detected for a certain period of time, then the demonstration system can be reset or provided with default playback content.

Figure 13:
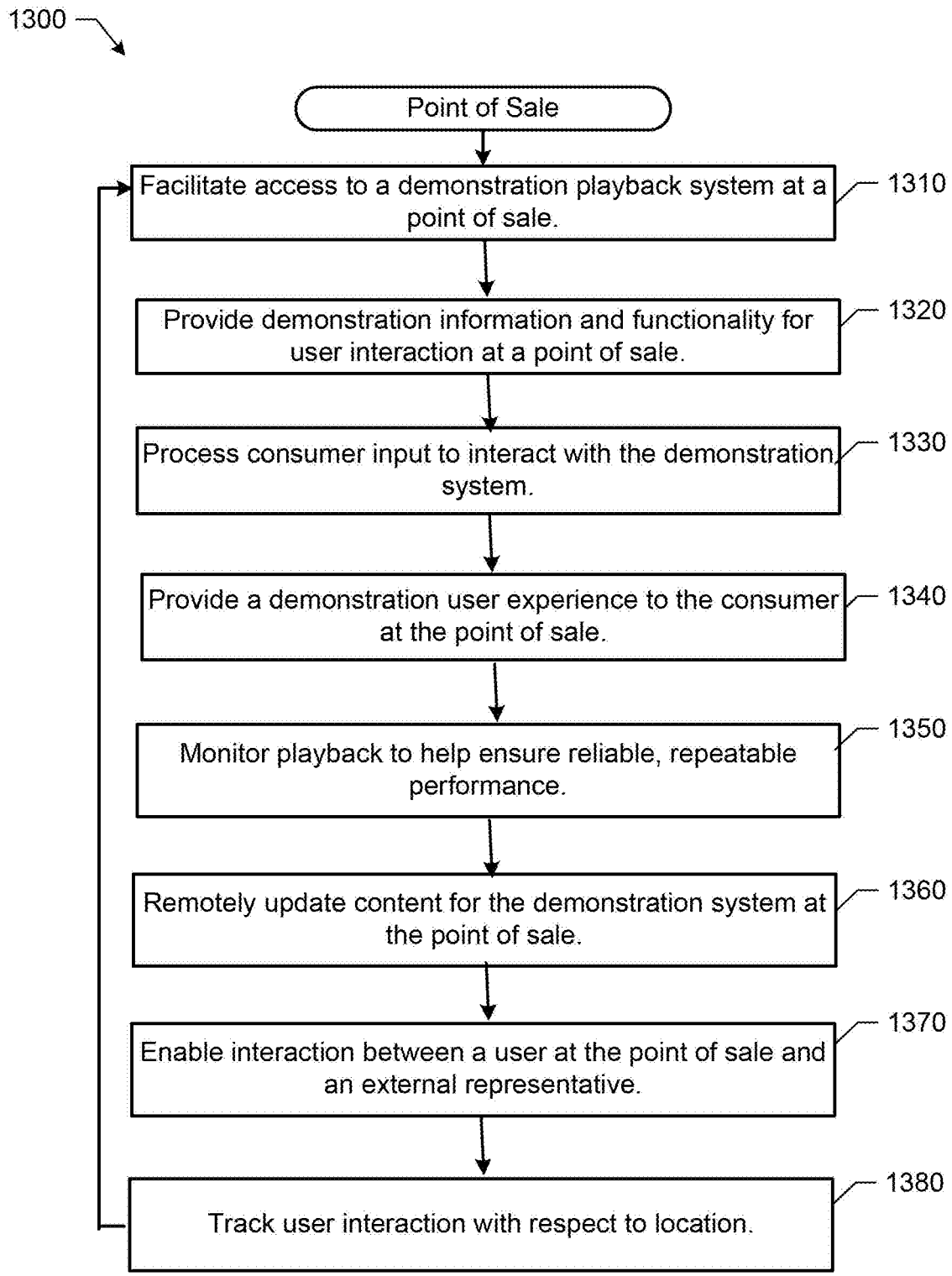
FIG. 13 shows a flowchart representative of an example method for playback device demonstration at a point of sale display.

FIG. 13 shows a flowchart representative of an example method 1300 for playback device demonstration at a point of sale display. At block 1310, a user (also referred to herein as a "consumer" or "potential consumer") accesses a demonstration playback system. For example, a user accesses a zone player and speaker demonstration station at a retail location (e.g., an electronics store).

At block 1320, demonstration information and functionality are provided for consumer interaction at a point of sale based on a user experience guideline. For example, a video or audio describing the demonstration playback devices, an alphanumeric descriptive display, and so on can be provided for consumer review. The consumer can also access functionality to play media content and so on via the demonstration configuration. In certain embodiments, one or more buttons are provided for the consumer to learn more about a device or device capability. In certain embodiments, a handheld controller, such as a smartphone controller, can be provided to facilitate consumer interaction with the point of sale demonstration device(s). In certain embodiments, the demonstration configuration allows the consumer to dock or otherwise connect his or her own device (e.g., a portable music player) to the demonstration playback device(s) for playback of the consumer's accessible content via the demonstration system. A user experience guideline can include whether or not the demonstration system is connected to an internal network or an external network, a type of POS display, a type of user, and so on.

At block 1330, consumer input is processed to interact with the demonstration system. For example, the consumer can review available content, select content for playback, adjust volume, and so on via a user interface associated with the demonstration system (e.g., a multi-button control panel) or other controller (e.g., a handheld smartphone controller application). The user interface/controller receives consumer input and relays it to an appropriate playback device, switcher, or control program, for example.

At block 1340, a demonstration user experience is provided to the consumer at the retail location. For example, a consumer can listen to music via a demonstration zone player at a point of sale, such as an electronics store.

At block 1350, demonstration playback is monitored to help ensure reliable performance and configuration at the point of sale. For example, if no user interaction is detected for a certain period of time, then the demonstration system can be reset or provided with default playback content.

At block 1360, if the demonstration system has an external network connection, content for the demonstration system at the point of sale may be updated remotely. For example, video can be loaded at a demonstration playback device at a POS display on demand. New promotions can be run at a POS display through the demonstration configuration without putting personnel at the POS display to facilitate the promotion, for example.

At block 1370, interaction between a consumer at the POS display and an external representative is enabled. In certain embodiments, the external representative works for the product company and is familiar with the product being offered for sale at the POS display. In an alternate embodiment, the external representative works for the retailer company. For example, a consumer can video chat or otherwise interaction over a network with a sales or technical representative via the demonstration configuration at a POS. In another example, a sales representative, sitting remotely from the POS display, may activate a demonstration of a product directly to the consumer. The external representative may be part of a sales team, support team, engineering team or some other group to engage with the consumer. In one example, a purchaser may even use the POS display as a way to get product support versus a way to purchase the product.

At block 1380, user interaction is tracked with respect to location. For example, consumer interaction with a demonstration playback device at a POS can be tracked remotely and reported (e.g., report a number of interactions, a type of interactions, and so on).

In view of the foregoing, it should be apparent that disclosed example systems, methods, apparatus, and articles of manufacture can be used to control audio playback devices. Some example systems, methods, apparatus, and articles of manufacture advantageously allow for simpler control of an audio system, including an audio playback device and an audio information source, from the perspective of a user of the system. In some such examples, the user of the system can control the playback of audio using any of multiple user input devices that can be configured to communicate with different elements of the system. Some example systems, methods, apparatus, and articles of manufacture disclosed herein permit the user of an audio system including an audio playback device and an audio information source to control the audio volume and audio input source using a user input device that is configured to communicate with the audio information source but is not configured to communicate with the audio playback device.

Example systems, methods, apparatus, and articles of manufacture disclosed herein maintain a consistent volume when changing between different audio information sources, where one or more of the different audio information sources have independent and/or different volume settings.

Various inventions have been described in sufficient detail with a certain degree of particularity. It is understood to those skilled in the art that the present disclosure of embodiments has been made by way of examples only and that numerous changes in the arrangement and combination of parts can be resorted without departing from the spirit and scope of the present disclosure as claimed. While the embodiments discussed herein can appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

We claim:

1. A playback device comprising:
   one or more processors; and
   tangible, non-transitory computer-readable medium having stored thereon instructions that, when executed by the one or more processors, cause the playback device to perform functions comprising:
   prior to connecting to a first portable user device, operating in a demonstration mode according to a default configuration as part of a plurality of playback devices located at a retail location and configured to demonstrate media playback, wherein the first portable user device is provided by a first user at the retail location;
   while operating in the demonstration mode according to the default configuration, communicatively connecting to the first portable user device at the retail location;

after connecting to the first portable user device at the retail location, receiving from the first portable user device, a first command for the playback device to play back media content from a first content source, wherein the first content source is a first streaming music service;

in response to receiving the first command, playing back the media content from the first content source, wherein playing back the media content from the first content source comprises modifying the default configuration of the demonstration mode;

while playing back the media content from the first content source, receiving from the first portable user device, a second command associated with the playback of the media content by the playback device, wherein the second command is at least one of (a) a command to adjust a volume level of the playback device; (b) a command to pause the playback of the media content by the playback device; or (c) a command to change the media content being played back by the playback device;

in response to receiving the second command, executing the second command associated with the playback of the media content by the playback device;

after receiving the first command and the second command, disconnecting from the first portable user device;

after disconnecting from the first portable user device, returning to the default configuration of the demonstration mode;

after returning to the default configuration of the demonstration mode, communicatively connecting to a second portable user device at the retail location, wherein the second portable user device is provided by a second user at the retail location;

after connecting to the second portable user device at the retail location, receiving from the second portable user device, a third command for the playback device to play back media content from a second content source, wherein the second content source is a second streaming music service;

in response to receiving the third command, playing back the media content from the second content source, wherein playing the media content from the second content source comprises modifying the default configuration of the demonstration mode;

while playing back the media content from the second content source, receiving from the second portable user device, a fourth command associated with the playback of the media content by the playback device, wherein the fourth command is at least one of (a) a command to adjust a volume level of the playback device; (b) a command to pause the playback of the media content by the playback device; or (c) a command to change the media content being played back by the playback device; and in response to receiving the fourth command, executing the fourth command associated with the playback of the media content by the playback device.

2. The playback device of claim 1, wherein the functions further comprise:
transmitting to a server, data indicating one or more of (a) the retail location, (b) the media content, or (c) the first content source.

3. The playback device of claim 1, wherein communicatively connecting to the first portable user device at the retail location comprises:

communicatively connecting to the first portable user device via a local area network associated with the retail location.

4. The playback device of claim 1, wherein communicatively connecting to the first portable user device at the retail location comprises:
communicatively connecting to the first portable user device according to a near-field communication protocol.

5. The playback device of claim 1, wherein playing back the media content from the first content source comprises at least one of:
(i) receiving the media content from the first streaming music service via the first portable user device or (ii) receiving the media content directly from the first streaming music service.

6. The playback device of claim 1, wherein playing back the media content from the second content source comprises at least one of:
(i) receiving the media content from the second streaming music service via the second portable user device or (ii) receiving the media content directly from the second streaming music service.

7. The playback device of claim 1, wherein the functions further comprise:
prior to disconnecting from the first portable user device, determining that the first portable user device is no longer at the retail location; and wherein disconnecting from the first portable user device comprises disconnecting from the first portable user device based on determining that the first portable user device is no longer at the retail location.

8. The playback device of claim 1, wherein the functions further comprise:
prior to disconnecting from the first portable user device, receiving from the first portable user device, a message to disconnect from the first portable user device; and wherein disconnecting from the first portable user device comprises disconnecting from the first portable user device based on the message to disconnect from the first portable user device.

9. The playback device of claim 1, wherein the playback device is a first playback device, wherein the plurality of playback devices comprises a second playback device, and wherein the functions comprise:
prior to receiving from the first portable user device the first command for the playback device to play back media content from the first content source, receiving a message to group the first playback device and the second playback device, wherein playing back the media content from the first content source comprises: facilitating synchronous playback of the media content from the first content source by the first playback device and second playback device.

10. The playback device of claim 1, wherein the default configuration comprises one or more of (i) a default grouping configuration of the playback device in the plurality of playback device, (ii) a default volume level of the playback device in the plurality of playback devices, or (iii) a default content source for the plurality of playback devices.

11. The playback device of claim 1, wherein the first portable user device is a first smartphone provided by the first user at the retail location and the second portable user device is a second smartphone provided by the second user at the retail location.

12. The playback device of claim 1, wherein the first streaming music service is the same as the second streaming music service.

13. A method comprising:
prior to connecting to a first portable user device, operating by a playback device, in a demonstration mode according to a default configuration as part of a plurality of playback devices located at a retail location and configured to demonstrate media playback, wherein the first portable user device is provided by a first user at the retail location;
while operating in the demonstration mode according to the default configuration, communicatively connecting by the playback device to the first portable user device at the retail location;
after connecting to the first portable user device at the retail location, receiving from the first portable user device, a first command for the playback device to play back media content from a first content source, wherein the first content source is a first streaming music service;
in response to receiving the first command, playing back by the playback device, the media content from the first content source, wherein playing back the media content from the first content source comprises modifying the default configuration of the demonstration mode;
while playing back the media content from the first content source, receiving, by the playback device from the first portable user device, a second command associated with the playback of the media content by the playback device, wherein the second command is at least one of (a) a command to adjust a volume level of the playback device; (b) a command to pause the playback of the media content by the playback device; or (c) a command to change the media content being played back by the playback device;
in response to receiving the second command, executing, by the playback device, the second command associated with the playback of the media content by the playback device;
after receiving the first command and the second command, disconnecting by the playback device from the first portable user device;
after disconnecting from the first portable user device, returning to the default configuration of the demonstration mode;
after returning to the default configuration of the demonstration mode, communicatively connecting to a second portable user device at the retail location, wherein the second portable user device is provided by a second user at the retail location;
after connecting to the second portable user device at the retail location, receiving from the second portable user device, a third command for the playback device to play back media content from a second content source, wherein the second content source is a second streaming music service;
in response to receiving the third command, playing back by the playback device, the media content from the second content source, wherein playing back the media content from the second content source comprises modifying the default configuration of the demonstration mode;
while playing back the media content from the second content source, receiving, by the playback device from the second portable user device, a fourth command associated with the playback of the media content by the playback device, wherein the fourth command is at least one of (a) a command to adjust a volume level of the playback device; (b) a command to pause the playback of the media content by the playback device; or (c) a command to change the media content being played back by the playback device; and
in response to receiving the fourth command, executing, by the playback device, the fourth command associated with the playback of the media content by the playback device.

14. The method of claim 13, further comprising:
transmitting by the playback device to a server, data indicating one or more of (a) the retail location, (b) the media content, or (c) the first content source.

15. The method of claim 13, wherein playing back by the playback device, the media content from the first content source comprises at least one of:
(i) receiving by the playback device, the media content from the first streaming music service via the first portable user device or (ii) receiving by the playback device, the media content directly from the first streaming music service.

16. The method of claim 13, wherein playing back by the playback device, the media content from the second content source comprises at least one of:
(i) receiving by the playback device, the media content from the second streaming music service via the second portable user device or (ii) receiving by the playback device, the media content directly from the second streaming music service.

17. The method of claim 13, further comprising:
prior to disconnecting from the first portable user device, determining by the playback device, that the first portable user device is no longer at the retail location; and
wherein disconnecting by the playback device from the first portable user device comprises disconnecting by the playback device from the first portable user device based on determining that the first portable user device is no longer at the retail location.

18. Tangible, non-transitory computer-readable medium having stored thereon instructions that, when executed by one or more processors of a playback device, cause the playback device to perform functions comprising:
prior to connecting to a first portable user device, operating in a demonstration mode according to a default configuration as part of a plurality of playback devices located at a retail location and configured to demonstrate media playback, wherein the first portable user device is provided by a first user at the retail location;
while operating in the demonstration mode according to the default configuration, communicatively connecting to the first portable user device at the retail location;
after connecting to the first portable user device at the retail location, receiving from the first portable user device, a first command for the playback device to play back media content from a first content source, wherein the first content source is a first streaming music service;
in response to receiving the first command, playing back the media content from the first content source, wherein playing back the media content from the first content source comprises modifying the default configuration of the demonstration mode;
while playing back the media content from the first content source, receiving from the first portable user device, a second command associated with the playback of the media content by the playback device, wherein the second command is at least one of (a) a command to adjust a volume level of the playback device; (b) a command to pause the playback of the media content by the playback device; or (c) a command to change the media content being played back by the playback device;

in response to receiving the second command, executing the second command associated with the playback of the media content by the playback device;

after receiving the first command and the second command, disconnecting from the first portable user device;

after disconnecting from the first portable user device, returning to the default configuration of the demonstration mode;

after returning to the default configuration of the demonstration mode, communicatively connecting to a second portable user device at the retail location, wherein the second portable user device is provided by a second user at the retail location;

after connecting to the second portable user device at the retail location, receiving from the second portable user device, a third command for the playback device to play back media content from a second content source, wherein the second content source is a second streaming music service;

in response to receiving the third command, playing back the media content from the second content source, wherein playing the media content from the second content source comprises modifying the default configuration of the demonstration mode;

while playing back the media content from the second content source, receiving from the second portable user device, a fourth command associated with the playback of the media content by the playback device, wherein the fourth command is at least one of (a) a command to adjust a volume level of the playback device; (b) a command to pause the playback of the media content by the playback device; or (c) a command to change the media content being played back by the playback device; and in response to receiving the fourth command, executing the fourth command associated with the playback of the media content by the playback device.

19. The tangible, non-transitory computer-readable medium of claim 18, wherein the functions further comprise:
prior to disconnecting from the first portable user device, receiving from the first portable user device, a message to disconnect from the first portable user device; and wherein disconnecting from the first portable user device comprises disconnecting from the first portable user device based on the message to disconnect from the first portable user device.

20. The tangible, non-transitory computer-readable medium of claim 18, wherein the playback device is a first playback device, wherein the plurality of playback devices comprises a second playback device, and wherein the functions comprise:
prior to receiving from the first portable user device the first command for the playback device to play back media content from the first content source, receiving a message to group the first playback device and the second playback device, wherein playing back the media content from the first content source comprises:
facilitating synchronous playback of the media content from the first content source by the first playback device and second playback device.

21. The tangible, non-transitory computer-readable medium of claim 18, wherein the default configuration comprises one or more of (i) a default grouping configuration of the playback device in the plurality of playback device, (ii) a default volume level of the playback device in the plurality of playback devices, or (iii) a default content source for the plurality of playback devices.

* * * * *